(12) United States Patent
Chen et al.

(10) Patent No.: US 10,877,244 B1
(45) Date of Patent: Dec. 29, 2020

(54) OPTICAL PHOTOGRAPHING SYSTEM AND ELECTRONIC DEVICE

(71) Applicant: LARGAN PRECISION CO.,LTD., Taichung (TW)

(72) Inventors: Chun-Yen Chen, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 16/676,301

(22) Filed: Nov. 6, 2019

(30) Foreign Application Priority Data

Aug. 23, 2019 (TW) .............................. 108130292 A

(51) Int. Cl.
*G02B 13/00* (2006.01)
*H04N 5/225* (2006.01)
*G02B 1/04* (2006.01)

(52) U.S. Cl.
CPC ......... *G02B 13/0015* (2013.01); *G02B 1/041* (2013.01); *H04N 5/2254* (2013.01)

(58) Field of Classification Search
CPC ... G02B 13/0015; G02B 1/041; H04N 5/2254
See application file for complete search history.

(56) References Cited

U.S. PATENT DOCUMENTS

| | | | |
|---|---|---|---|
| 3,844,640 A * | 10/1974 | Nakagawa | G02B 13/04 359/751 |
| 4,666,259 A | 5/1987 | Iizuka | |
| 4,714,307 A | 12/1987 | Palmer | |
| 5,452,126 A | 9/1995 | Johnson | |
| 5,930,055 A | 7/1999 | Eisenberg | |
| 6,169,637 B1 * | 1/2001 | Tsunashima | G02B 17/0808 359/726 |
| 8,767,318 B2 | 7/2014 | Hatakeyama | |
| 8,896,938 B2 | 11/2014 | Hatakeyama | |
| 9,151,932 B2 * | 10/2015 | Ryu | G02B 13/02 |
| 9,568,718 B2 | 2/2017 | Nagamatsu | |
| 9,823,453 B2 | 11/2017 | Lee et al. | |
| 10,133,043 B1 | 11/2018 | Lu | |
| 2005/0225881 A1 | 10/2005 | Vizgaitis | |
| 2010/0071768 A1 | 3/2010 | Liu | |

(Continued)

FOREIGN PATENT DOCUMENTS

| | | |
|---|---|---|
| CN | 102707413 | 10/2012 |
| JP | 2003-167196 | 6/2003 |

(Continued)

*Primary Examiner* — Amy R Hsu
(74) *Attorney, Agent, or Firm* — Maschoff Brennan

(57) ABSTRACT

An optical photographing system includes a plurality of lens elements which include, in order from an object side to an image side: a first lens element, a second lens element and a last lens element. There is no additional lens element disposed between the first lens element and the second lens element, and there is no additional lens element disposed between the last lens element and an image surface. The first lens element has a first refractive surface, a first reflective surface, a second reflective surface and a second refractive surface. The first reflective surface faces toward the object side, and the second reflective surface faces toward the image side. At least one lens element of the optical photographing system has at least one lens surface with at least one inflection point.

33 Claims, 20 Drawing Sheets

(56) References Cited

U.S. PATENT DOCUMENTS

| | | | |
|---|---|---|---|
| 2011/0058089 A1* | 3/2011 | Tang | G02B 13/004 |
| | | | 348/340 |
| 2013/0010180 A1 | 1/2013 | Hatakeyama | |
| 2013/0010376 A1 | 1/2013 | Hatakeyama | |
| 2014/0098277 A1 | 4/2014 | Nagamatsu et al. | |
| 2015/0022700 A1* | 1/2015 | Chen | G02B 13/0045 |
| | | | 348/294 |
| 2016/0269667 A1 | 9/2016 | Ono | |
| 2016/0306149 A1 | 10/2016 | Eisenberg et al. | |
| 2019/0082093 A1 | 3/2019 | Ono | |
| 2019/0187446 A1* | 6/2019 | Dai | G02B 13/004 |

FOREIGN PATENT DOCUMENTS

| | | |
|---|---|---|
| JP | 2016-035499 | 1/2016 |
| JP | 2018-109673 | 7/2018 |

* cited by examiner

OPTICAL PHOTOGRAPHING SYSTEM AND ELECTRONIC DEVICE

RELATED APPLICATIONS

This application claims priority to Taiwan Application 108130292, filed on Aug. 23, 2019, which is incorporated by reference herein in its entirety.

BACKGROUND

Technical Field

The present disclosure relates to an optical photographing system and an electronic device, more particularly to an optical photographing system applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical photographing system includes a plurality of lens elements. The plurality of lens elements includes, in order from an object side to an image side, a first lens element, a second lens element and a last lens element. There is no additional lens element disposed between the first lens element and the second lens element, and there is no additional lens element disposed between the last lens element and an image surface.

The first lens element has a first refractive surface, a first reflective surface, a second reflective surface and a second refractive surface. The first reflective surface faces toward the object side, and the second reflective surface faces toward the image side. At least one lens element of the optical photographing system has at least one lens surface with at least one inflection point.

When a vertical distance between the at least one inflection point and an optical axis is Yinf, a maximum effective radius of the second reflective surface is YM2, a focal length of the optical photographing system is f, and a curvature radius of an object-side surface of the last lens element is RLO, the following conditions are satisfied:

$$0 < Yinf/YM2 < 2.0; \text{ and}$$

$$-3.0 < f/RLO.$$

According to another aspect of the present disclosure, an optical photographing system includes a plurality of lens elements. The plurality of lens elements includes, in order from an object side to an image side, a first lens element, a second lens element and a last lens element. There is no additional lens element disposed between the first lens element and the second lens element, and there is no additional lens element disposed between the last lens element and an image surface.

The first lens element has an object-side surface facing toward the object side and an image-side surface facing toward the image-side surface. Each of the object-side surface and the image-side surface of the first lens element has a central area and a peripheral area. There are a first refractive surface in the peripheral area of the object-side surface of the first lens element, a first reflective surface in the peripheral area of the image-side surface of the first lens element, a second reflective surface in the central area of the object-side surface of the first lens element, and a second refractive surface in the central area of the image-side surface of the first lens element. At least one lens element of the optical photographing system has at least one lens surface with at least one inflection point.

When a vertical distance between the at least one inflection point and an optical axis is Yinf, a maximum effective radius of the second reflective surface is YM2, and a minimum value among Abbe numbers of all lens elements of the optical photographing system is Vmin, the following conditions are satisfied:

$$0 < Yinf/YM2 < 2.0; \text{ and}$$

$$10.0 < Vmin < 20.0.$$

According to another aspect of the present disclosure, an electronic device includes at least two image capturing units disposed on the same side of the electronic device. The at least two image capturing units includes a first image capturing unit and a second image capturing unit. The first image capturing unit includes the aforementioned optical photographing system and an image sensor disposed on the image surface of the optical photographing system. The second image capturing unit includes an optical lens assembly and an image sensor disposed on an image surface of the optical lens assembly. A maximum field of view of the first image capturing unit and a maximum field of view of the second image capturing unit differ by at least 45 degrees.

According to another aspect of the present disclosure, an optical photographing system includes a plurality of lens elements. The plurality of lens elements includes, in order from an object side to an image side, a first lens element, a second lens element and a last lens element. There is no additional lens element disposed between the first lens element and the second lens element, and there is no additional lens element disposed between the last lens element and an image surface.

The first lens element has a first refractive surface, a first reflective surface, a second reflective surface and a second refractive surface. The first reflective surface faces toward the object side, and the second reflective surface faces toward the image side. At least one lens element of the optical photographing system has at least one lens surface with at least one inflection point. There is a recess structure in a central area of an image-side surface of the first lens element, and the second lens element is located in the recess structure.

When a vertical distance between the at least one inflection point and an optical axis is Yinf, a maximum effective radius of the second reflective surface is YM2, and a minimum value among Abbe numbers of all lens elements of the optical photographing system is Vmin, the following conditions are satisfied:

0<Yinf/YM2<2.0; and 5.0<Vmin<30.0.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
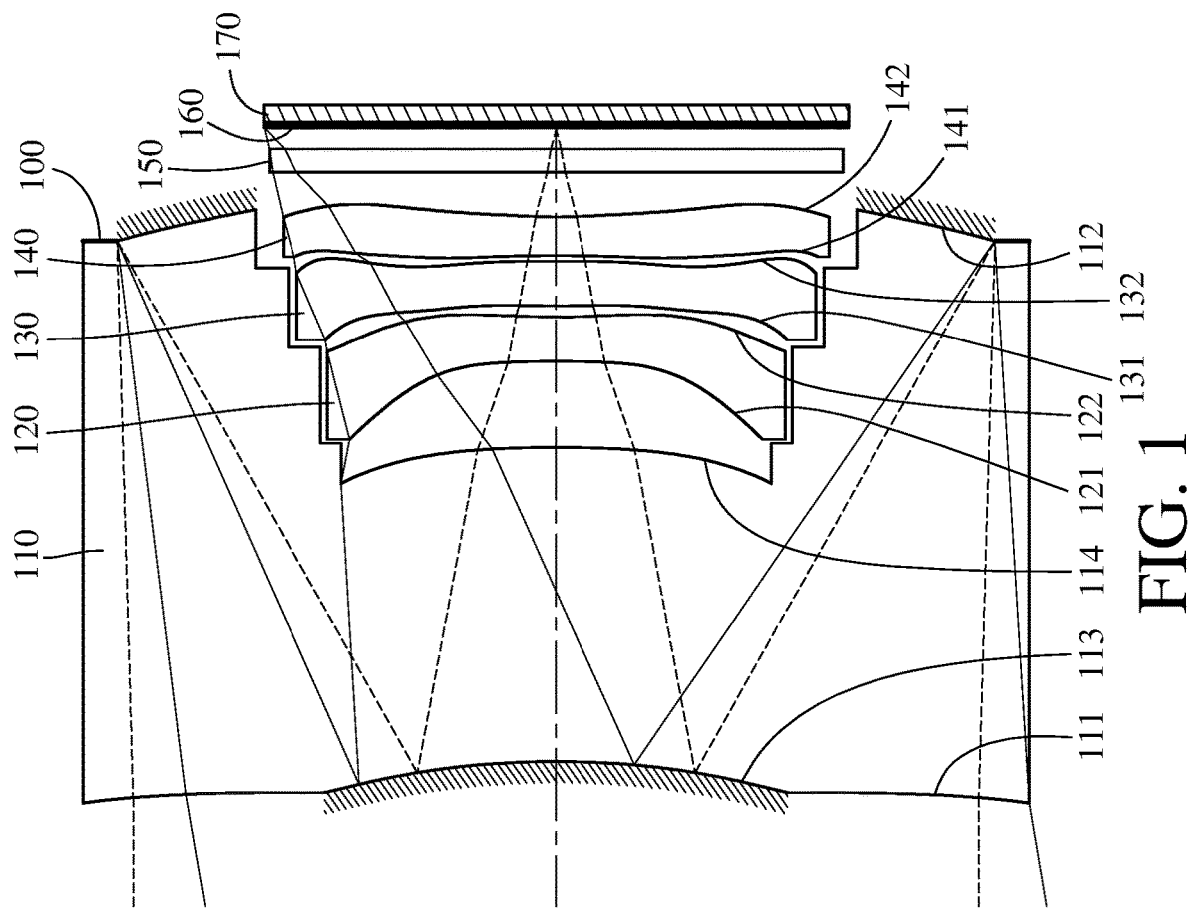
FIG. 1 is a schematic view of an image capturing unit according to the 1st embodiment of the present disclosure.

An optical photographing system includes a plurality of lens elements. The plurality of lens elements includes, in order from an object side to an image side, a first lens element, a second lens element and a last lens element, and each of all lens elements in the optical photographing system has an object-side surface facing toward the object side and an image-side surface facing toward the image side. There is no additional lens element disposed between the first lens element and the second lens element, and there is no additional lens element disposed between the last lens element and an image surface.

The first lens element has a first refractive surface, a first reflective surface, a second reflective surface and a second refractive surface. Therefore, it is favorable for eliminating the need of disposing an additional reflector so as to provide a compact configuration, thereby reducing the required quantity of components, manufacturing costs, and assembly tolerance.

The first reflective surface can face toward the object side, and the second reflective surface can face toward the image side. Therefore, it is favorable for achieving a small field of view configuration without increasing the thickness of the optical photographing system.

The first refractive surface, the first reflective surface, the second reflective surface and the second refractive surface can be coaxial on the optical axis. Therefore, is it favorable for increasing the symmetry of the optical photographing system and thus favorable for imaging.

The first refractive surface can be in a peripheral area of the object-side surface of the first lens element, and the first refractive surface can have an outer effective radius YR1o and an inner effective radius YR1i, wherein the first refractive surface can be distributed between two concentric circles respectively having radii of YR1o and YR1i. The first reflective surface can be in a peripheral area of the image-side surface of the first lens element, and the first reflective surface can have an outer effective radius YM1o and an inner effective radius YM1i, wherein the first reflective surface can be distributed between two concentric circles respectively having radii of YM1o and YM1i. The second reflective surface can be in a central area of the object-side surface of the first lens element, and the second reflective surface can be distributed within a range of a maximum effective radius YM2 thereof. The second refractive surface can be in a central area of the image-side surface of the first lens element, and the second refractive surface can be distributed within a range of a maximum effective radius YR2 thereof. Therefore, it is favorable for utilizing reflective surfaces to effectively arrange the space of the optical photographing system and prevent the total width of the optical photographing system from being overly large.

The first reflective surface can be concave, and the second reflective surface can be convex. Therefore, it is favorable for receiving a wider range of light on the first reflective surface and adjusting the light on the second reflective surface so as to generate an optimal imaging optical path.

The optical path can sequentially pass by the first refractive surface, the first reflective surface, the second reflective surface and the second refractive surface. Therefore, it is favorable for reducing the optical path at the object side of the optical photographing system so as to prevent affecting the correction of peripheral aberrations at the image side thereof.

The first lens element can be made of plastic material. Therefore, it is favorable for increasing the shape design flexibility of the first lens element and thus favorable for manufacturing the first lens element and correcting aberrations.

The last lens element can have positive refractive power. Therefore, it is favorable for effectively correcting the angle of incident light on the image surface so as to prevent distortion.

The object-side surface of the last lens element can be convex in a paraxial region thereof. Therefore, it is favorable for correcting coma and astigmatism of the optical photographing system.

The image-side surface of the last lens element can be concave in a paraxial region thereof. Therefore, it is favorable for reducing the back focal length of the optical photographing system so as to prevent the total length of the lens from being overly long. Moreover, the image-side surface of the last lens element can be concave in a paraxial region thereof while having at least one convex shape in an off-axis region thereof. Therefore, it is favorable for correcting field curvature and distortion so as to flatten the Petzval surface of the optical photographing system.

The last lens element can be closer to the object side than the first reflective surface is to the object side. Therefore, it is favorable for improving the space utilization efficiency so as to miniaturize the optical photographing system, and also favorable for reducing the required quantity of components so as to lower manufacturing costs.

At least one lens surface of at least one lens element of the optical photographing system has at least one inflection point. Therefore, it is favorable for correcting aberrations in the peripheral region so as to improve image quality. Moreover, at least one lens surface of each of the second lens element and the last lens element can have at least one inflection point. Therefore, it is favorable for correcting aberrations in the peripheral region. Please refer to FIG. 18, which shows a schematic view of inflection points P of the second lens element 120, the third lens element 130 and the fourth lens element 140 according to the 1st embodiment of the present disclosure.

Figure 17:
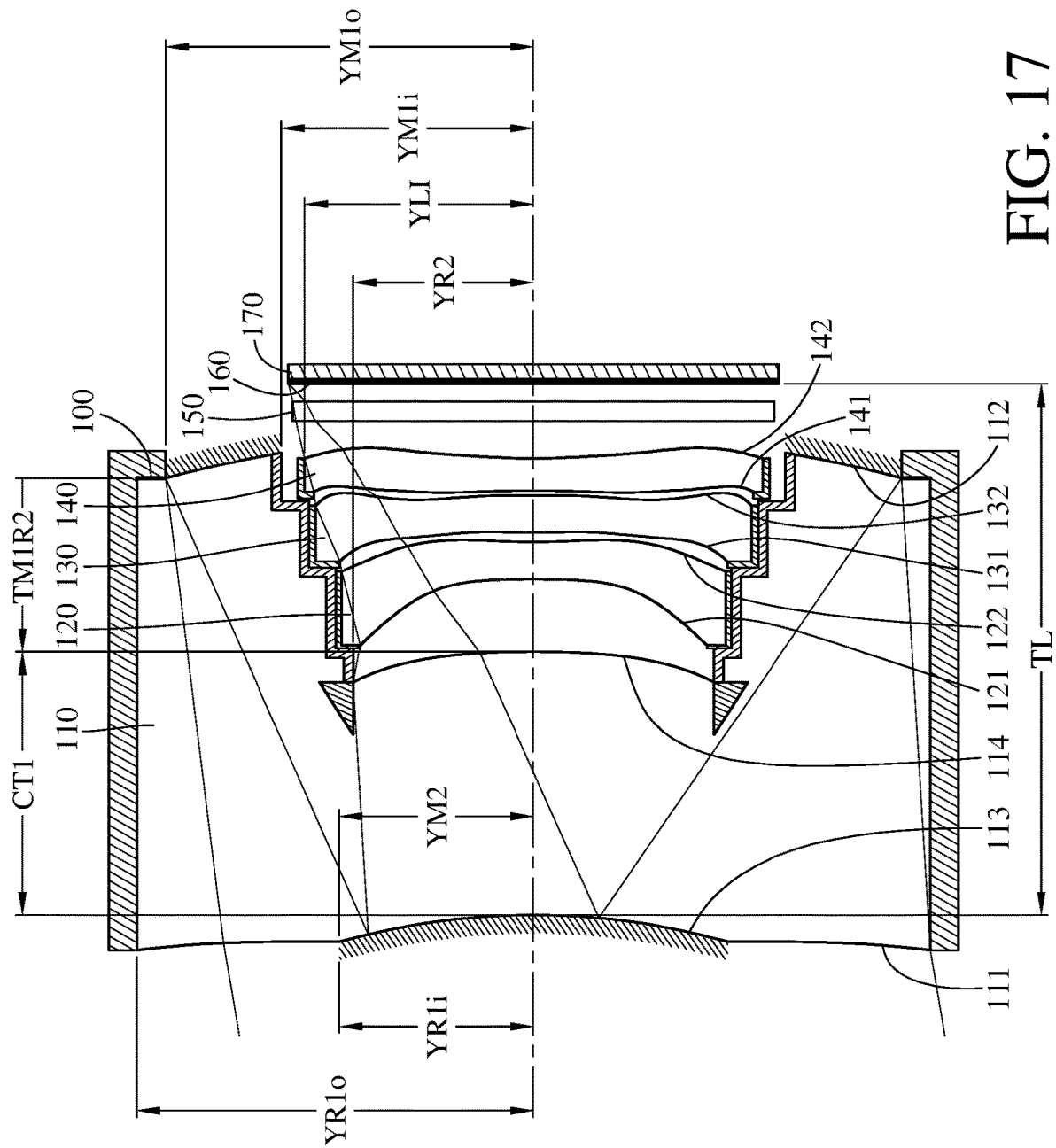
FIG. 17 shows a schematic view of YR1o, YR1i, YM1o, YM1i, YM2, YR2, CT1, TM1R2, YLI and TL according to the 1st embodiment of the present disclosure.

When a vertical distance between the at least one inflection point and the optical axis is Yinf, and the maximum effective radius of the second reflective surface is YM2, the following condition is satisfied: $0<Yinf/YM2<2.0$. Therefore, it is favorable for correcting light at different fields by different curvature directions of the lens elements on various radius positions thereof. Moreover, when a vertical distance between an inflection point on the object-side surface of the i-th lens element and the optical axis is Yinfi1, and a vertical distance between an inflection point on the image-side surface of the i-th lens element and the optical axis is Yinfi2, any inflection point on the lens surfaces of the optical photographing system can also satisfy the following condition: $0<Yinfij/YM2<2.0$, wherein i is a positive integer, j=1 or 2. Please refer to FIG. 17, which shows a schematic view of YM2 according to the 1st embodiment of the present disclosure. Please refer to FIG. 18, which shows a schematic view of Yinf22 according to the 1st embodiment of the present disclosure.

At least one lens surface of at least one lens element of the optical photographing system can have at least one critical point in an off-axis region thereof. When a vertical distance between the at least one critical point and the optical axis is Yc, and an axial distance between the second reflective surface and the image surface is TL, the following condition can be satisfied: $0.01<Yc/TL<1.50$. Therefore, it is favorable for correcting aberrations on the peripheral image. Moreover, when a vertical distance between a critical point on the object-side surface of the i-th lens element and the optical axis is Yci1, and a vertical distance between a critical point on the image-side surface of the i-th lens element and the optical axis is Yci2, any critical point on the lens surfaces of the lens elements of the optical photographing system can also satisfy the following condition: $0.01<Ycij/TL<1.50$, wherein i is a positive integer, j=1 or 2. Please refer to FIG. 17, which shows a schematic view of TL according to the 1st embodiment of the present disclosure. Please refer to FIG. 18, which shows a schematic view of Yc22 as well as critical points C of the second lens element 120, the third lens element 130 and the fourth lens element 140 according to the 1st embodiment of the present disclosure.

There can be a recess structure in the central area of the image-side surface of the first lens element, and the second lens element can be located in the recess structure. Therefore, it is favorable for improving the space utilization so as to effectively reduce the size of the optical photographing system. Furthermore, the aforementioned lens element can be located fully inside the recess structure. Please refer to FIG. 1, FIG. 3, FIG. 5 and FIG. 7, which respectively show schematic views of the second lens elements 120, 220, 320 and 420 being located fully inside the recess structures according to the 1st through 4th embodiments of the present disclosure. In addition, please refer to FIG. 9, FIG. 11 and FIG. 13, which respectively show schematic views of the second lens elements 520, 620 and 720 being partially located inside the recess structures according to the 5th through 7th embodiments of the present disclosure.

There can be a light limiting region at an inner surface of the recess structure in the central area of the image-side surface of the first lens element. Therefore, it is favorable for limiting unwanted light from entering the image surface so as to prevent image ghosting. Note that the light limiting region is referred to as the opaque part on the lens surface, which can be a lens surface coating, a lens surface roughness treatment or an opaque portion by molding, etc. Please refer to FIG. 18, which shows a schematic view of the light limiting region S1 at the inner surface of the recess structure according to the 1st embodiment of the present disclosure.

There can be a stepped structure on the inner surface of the recess structure in the central area of the image-side surface of the first lens element. Therefore, it is favorable for controlling the positions of the lens elements in different sizes and preventing obstruction in the light path inside the first lens element. Please refer to FIG. 18, which shows a schematic view of the stepped structure on the inner surface of the recess structure according to the 1st embodiment of the present disclosure.

There can be a light limiting region at the bottom of the recess structure in the central area of the image-side surface of the first lens element. Therefore, it is favorable for ensuring that light enters the optical photographing system within a range of the maximum effective radius of the lens element so as to prevent undesirable light spots. Please refer to FIG. 18, which shows a schematic view of the light limiting region S2 at the bottom of the recess structure according to the 1st embodiment of the present disclosure.

Figure 18:
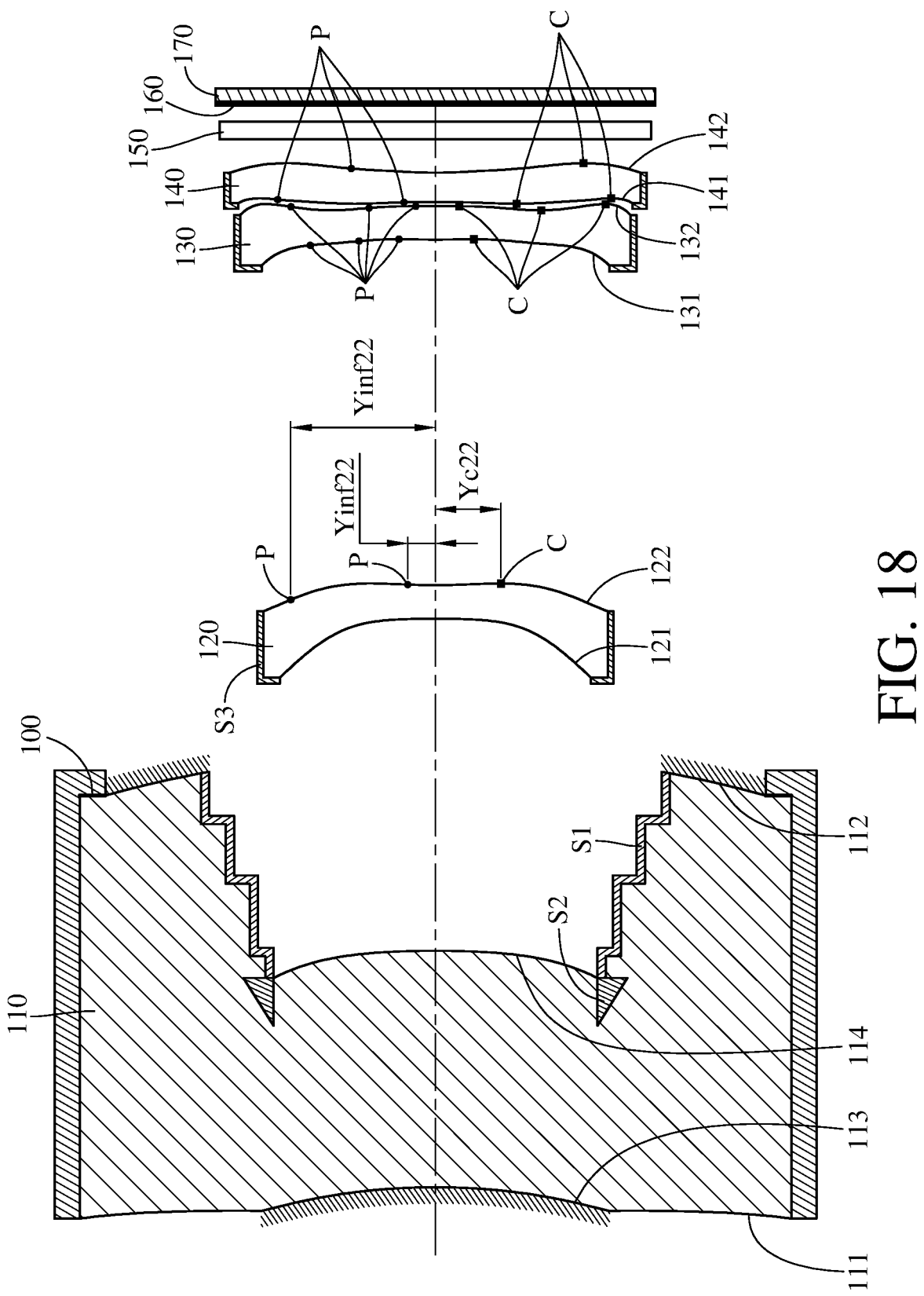
FIG. 18 shows a schematic view of Yinf22, Yc22 and light limiting regions S1-S3, as well as several inflection points and critical points of the lens elements according to the 1st embodiment of the present disclosure.
Figure 19:
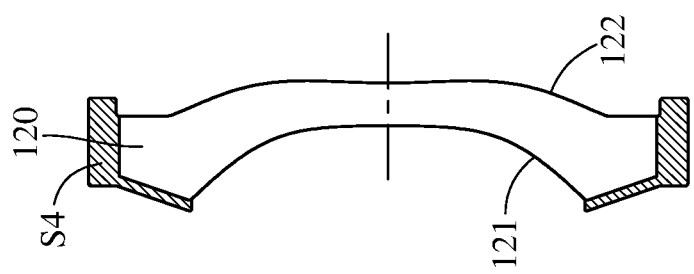
FIG. 19 shows a schematic view of another light limiting region S4 at a peripheral region of a lens element.

Each of the second lens element and the last lens element can have a light limiting region at a peripheral region thereof. Therefore, it is favorable for limiting the light reflected in the peripheral region of the lens element, which is beneficial to reduce stray light. Please refer to FIG. 18, which shows a schematic view of the light limiting region S3 at the peripheral region of the second lens element 120 according to 1st embodiment of the present disclosure. The light limiting region at the peripheral region of the second lens element in FIG. 18 is only exemplary. The other lens element may also have a light limiting region at the peripheral region thereof. Note that the light limiting region S3 at the peripheral region of the second lens element 120 according to 1st embodiment of the present disclosure can be a lens surface coating or a lens surface roughness treatment, but the present disclosure is not limited thereto. Please refer to FIG. 19, which shows a schematic view of a light limiting region S4 being opaque and formed by two materials at a peripheral region of a lens element.

When a focal length of the optical photographing system is f, and a curvature radius of the object-side surface of the last lens element is RLO, the following condition can be satisfied: −3.0<f/RLO. Therefore, it is favorable for preventing overly strong refractive power from an overly large curvature of the object-side surface of the last lens element, thereby reducing aberrations.

Moreover, the following condition can also be satisfied: −3.0<f/RLO<20.0. Moreover, the following condition can also be satisfied: −1.50<f/RLO<15.0.

When a minimum value among Abbe numbers of all lens elements of the optical photographing system is Vmin, the following condition can be satisfied: 5.0<Vmin<30.0. Therefore, a proper lens material is favorable for balancing the focus positions of light in different bandwidths and preventing image overlaps. Moreover, the following condition can also be satisfied: 5.0<Vmin<25.0. Moreover, the following condition can also be satisfied: 10.0<Vmin<20.0. Moreover, the following condition can also be satisfied: 10.0<Vmin≤19.5.

Figure 20:
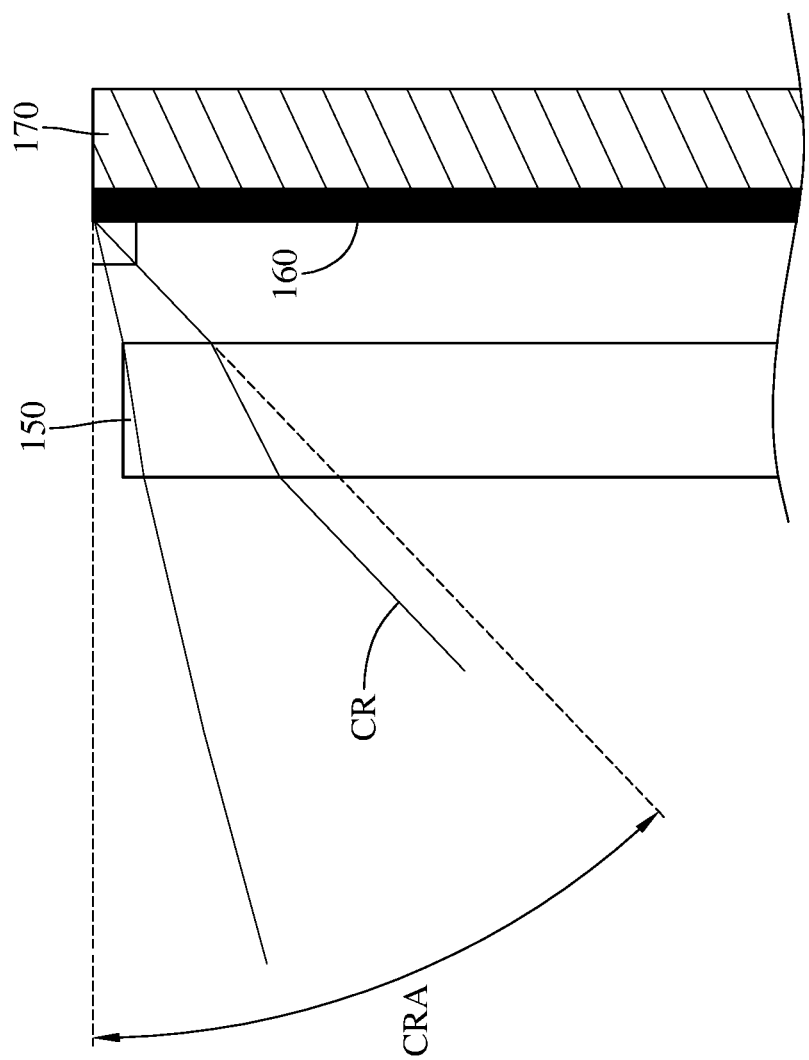
FIG. 20 a schematic view of CRA according to the 1st embodiment of the present disclosure.

When a maximum value among all chief ray angles on the image surface of the optical photographing system is CRAmax, the following condition can be satisfied: CRAmax<35 [deg.]. Therefore, it is favorable for controlling angles of incident light on the image surface so as to increase brightness of peripheral image and prevent vignetting. Moreover, the following condition can also be satisfied: CRAmax<30 [deg.]. Moreover, the following condition can also be satisfied: CRAmax<25 [deg.]. Please refer to FIG. 20, which shows a schematic view of chief ray angle CRA according to the 1st embodiment of the present disclosure, wherein a chief ray CR is projected on the image surface 160 at an imaging position, and the angle between a normal line of the image surface 160 and the chief ray CR is CRA. Each of chief rays CR incident on the image surface 160 at different imaging positions respectively corresponds to each of different chief ray angles CRA, and the maximum value among the chief ray angles CRA is CRAmax.

When the axial distance between the second reflective surface and the image surface is TL, the following condition can be satisfied: TL<9.0 [mm]. Therefore, it is favorable for controlling the total track length so as to miniaturize the optical photographing system. Moreover, the following condition can also be satisfied: TL<6.80 [mm]. Please refer to FIG. 17, which shows a schematic view of TL according to the 1st embodiment of the present disclosure.

When a sum of central thicknesses of all lens elements of the optical photographing system is ΣCT, and the axial distance between the second reflective surface and the image surface is TL, the following condition can be satisfied: 0.60<ΣCT/TL<0.95. Therefore, it is favorable for controlling the thicknesses of lens elements so as to improve space utilization and achieve compactness.

When the axial distance between the second reflective surface and the image surface is TL, and the outer effective radius of the first refractive surface is YR1o, the following condition can be satisfied: 0.50<TL/YR1o<2.0. Therefore, it is favorable for balancing the ratio of the width to the height of the lens so that the optical photographing system can meet the dimension requirement while achieving optical specifications. Please refer to FIG. 17, which shows a schematic view of TL and YR1o according to the 1st embodiment of the present disclosure.

When the outer effective radius of the first refractive surface is YR1o, the following condition can be satisfied: 2.0 [mm]<YR1o<10.0 [mm]. Therefore, it is favorable for effectively configuring the size of entrance pupil for incident light in the first lens element so as to receive sufficient light and control the lens size.

When half of a maximum field of view of the optical photographing system is HFOV, the following condition can be satisfied: 0 [deg.]<HFOV<15.0 [deg.]. Therefore, it is favorable for capturing details of smaller objects from afar so as to achieve the telephoto function.

When the outer effective radius of the first refractive surface is YR1o, and the inner effective radius of the first refractive surface is YR1i, the following condition can be satisfied: 1.20<YR1o/YR1i<2.50. Therefore, it is favorable for effectively controlling the proportion of the optical effective area of the first refractive surface so as to prevent stray light while keeping sufficient image brightness. Please refer to FIG. 17, which shows a schematic view of YR1o and YR1i according to the 1st embodiment of the present disclosure.

When an Abbe number of a lens element of the optical photographing system is V, and a refractive index of the lens element of the optical photographing system is N, at least one lens element of the optical photographing system can satisfy the following condition: V/N<12.0. Therefore, it is favorable for correcting chromatic aberration.

When the maximum effective radius of the second refractive surface is YR2, and a maximum effective radius of the image-side surface of the last lens element is YLI, the following condition can be satisfied: 0.70<YR2/YLI<1.30. Therefore, it is favorable for controlling the ratio of the maximum effective radius of the second refractive surface to the maximum effective radius of the last lens element so as to prevent the angle of light entering or exiting the lens element from being overly large due to an overly large difference between the maximum effective radii thereof, thereby preventing total reflection. Please refer to FIG. 17, which shows a schematic view of YR2 and YLI according to the 1st embodiment of the present disclosure.

When the outer effective radius of the first reflective surface is YM1o, and the inner effective radius of the first reflective surface is YM1i, the following condition can be satisfied: 1.10<YM1o/YM1i<1.80. Therefore, it is favorable for balancing the ratio of the outer effective radius to the inner effective radius of the first reflective surface so as to ensure a sufficient amount of incident light and sufficient space on the second refractive surface to adjust the optical path. Please refer to FIG. 17, which shows a schematic view of YM1o and YM1i according to the 1st embodiment of the present disclosure.

When the inner effective radius of the first reflective surface is YM1i, and the maximum effective radius of the second refractive surface is YR2, the following condition can be satisfied: 1.10<YM1i/YR2<2.0. Therefore, it is favorable for balancing the ratio of the inner effective radius of the first reflective surface to the maximum effective radius of the second refractive surface so as to reduce stray light.

When an axial distance between the image-side surface of the last lens element and the image surface is BL, and the maximum effective radius of the second reflective surface is YM2, the following condition can be satisfied: 0.10<BL/YM2<0.75. Therefore, it is favorable for effectively controlling the ratio of the back focal length to the maximum effective radius of the second reflective surface so as to effectively reduce the total track length.

When a minimum value among relative illuminances of all fields of view of the optical photographing system is RImin, the following condition can be satisfied: 60%<RImin<100%. Therefore, it is favorable for preventing image brightness from being uneven so as to avoid poor image quality.

When a maximum image height of the optical photographing system (half of a diagonal length of an effective photosensitive area of an image sensor) is ImgH, and the inner effective radius of the first reflective surface is YM1$i$, the following condition can be satisfied: ImgH/YM1$i$<1.0. Therefore, it is favorable for controlling the image height so as to prevent the light deflection angle from being overly large and poor relative illuminance of the peripheral image.

When the outer effective radius of the first refractive surface is YR1$o$, and the maximum image height of the optical photographing system is ImgH, the following condition can be satisfied: 1.20<YR1$o$/ImgH<5.0. Therefore, it is favorable for balancing the ratio between first refractive surface and the image surface so as to receive incident light in a larger range with sufficient image illuminances.

When the maximum image height of the optical photographing system is ImgH, and the focal length of the optical photographing system is f, the following condition can be satisfied: ImgH/f<0.25. Therefore, it is favorable for effectively controlling the viewing angle of the optical photographing system so as to provide a telephoto configuration for various applications.

When the axial distance between the second reflective surface and the image surface is TL, and the focal length of the optical photographing system is f, the following condition can be satisfied: 0.10<TL/f<0.65. Therefore, it is favorable for miniaturizing the optical photographing system with a telephoto configuration and obtaining compactness.

When a central thickness of the first lens element is CT1, and the sum of central thicknesses of all lens elements of the optical photographing system is ΣCT, the following condition can be satisfied: 1.0<CT1/(ΣCT−CT1)<10.0. Therefore, it is favorable for improving the power of the first lens element so as to provide better size reduction of the optical photographing system. In detail, CT1 is referred as the axial thickness of the first lens element, namely the axial distance between the second reflective surface and the second refractive surface. Please refer to FIG. 17, which shows a schematic view of CT1 according to the 1st embodiment of the present disclosure.

When the inner effective radius of the first reflective surface is YM1$i$, the maximum effective radius of the second refractive surface is YR2, and a displacement in parallel with the optical axis from an outer effective radius position of the first reflective surface to an axial vertex of the second refractive surface is TM1R2, the following condition can be satisfied: −3.0<(YM1$i$−YR2)/TM1R2<−0.1. Therefore, it is favorable for effectively controlling the recess structure of the first lens element so as to facilitate compactness and a sufficient range for receiving light. Moreover, the following condition can also be satisfied: −2.0<(YM1$i$−YR2)/TM1R2<−0.2. Furthermore, TM1R2 is a directional displacement. When the displacement from the outer effective radius position of the first reflective surface to the axial vertex of the second refractive surface is facing toward the image side of the optical photographing system, TM1R2 is a positive value; when the displacement from the outer effective radius position of the first reflective surface to the axial vertex of the second refractive surface is facing toward the object side of the optical photographing system, TM1R2 is a negative value. Please refer to FIG. 17, which shows a schematic view of TM1R2 according to the 1st embodiment of the present disclosure.

According to the present disclosure, the aforementioned features and conditions can be utilized in numerous combinations so as to achieve corresponding effects.

According to the present disclosure, the lens elements of the optical photographing system can be made of either glass or plastic material. When the lens elements are made of glass material, the refractive power distribution of the optical photographing system may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the optical photographing system can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical photographing system, based on the corresponding image sensor, can be flat or curved, especially a curved surface being concave facing towards the object side of the optical photographing system.

According to the present disclosure, an image correction unit, such as a field flattener, can be optionally disposed between the lens element closest to the image side of the optical photographing system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical photographing system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical photographing system and thereby provides a wider field of view for the same.

According to the present disclosure, the optical photographing system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
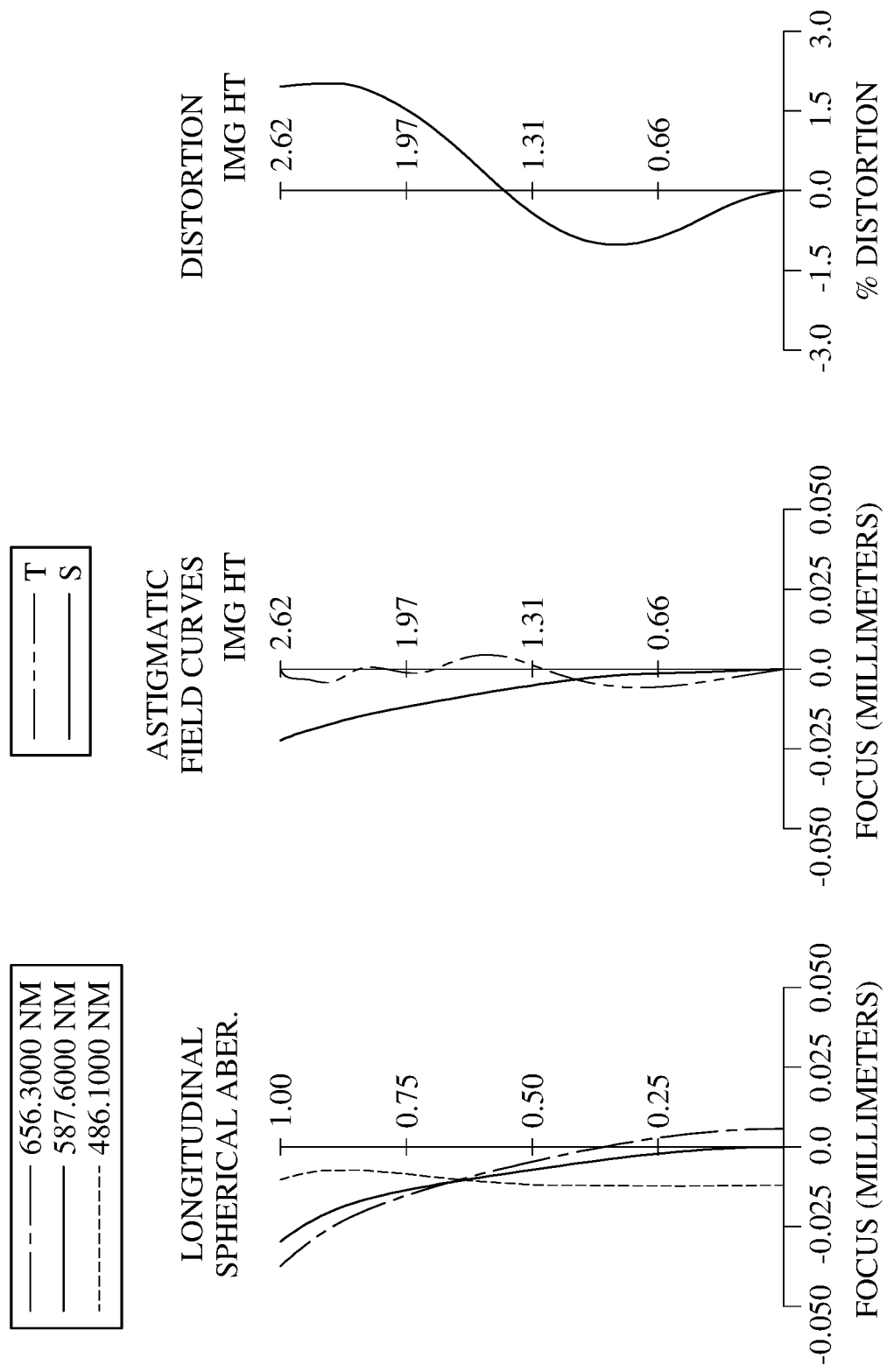
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical photographing system (its reference numeral is omitted) of the present disclosure and an image sensor 170. The optical photographing system includes, in order of an optical path sequentially passing by, a first lens element 110, an aperture stop 100, a second lens element 120, a third lens element 130, a fourth lens element 140, a filter 150 and an image surface 160. The optical photographing system includes four lens elements (110, 120, 130 and 140) with no additional lens element disposed between each of the adjacent four lens elements.

The first lens element 110 has a first refractive surface 111 being convex in a paraxial region thereof, a first reflective surface 112 being concave in a paraxial region thereof, a second reflective surface 113 being convex in a paraxial region thereof and a second refractive surface 114 being convex in a paraxial region thereof. The first refractive surface 111 faces toward an object side and is in a peripheral area of an object-side surface (its reference numeral is omitted) of the first lens element 110. The first reflective surface 112 faces toward the object side and is in a peripheral area of an image-side surface (its reference numeral is omitted) of the first lens element 110. The second reflective surface 113 faces toward an image side and is in a central area of the object-side surface of the first lens element 110. The second refractive surface 114 faces toward the image side and is in a central area of the image-side surface of the first lens element 110. The first lens element 110 is made of plastic material and has the first refractive surface 111, the first reflective surface 112, the second reflective surface 113 and the second refractive surface 114 being all aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The image-side surface 122 of the second lens element 120 has two inflection points and has one critical point in an off-axis region thereof.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has three inflection points and has one critical point in an off-axis region thereof. The image-side surface 132 of the third lens element 130 has three inflection points and has three critical points in an off-axis region thereof.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has two inflection points and has two critical points in an off-axis region thereof. The image-side surface 142 of the fourth lens element 140 has one inflection point and has one critical point in an off-axis region thereof.

The filter 150 is made of glass material and located between the fourth lens element 140 and the image surface 160, and will not affect the focal length of the optical photographing system. The image sensor 170 is disposed on or near the image surface 160 of the optical photographing system.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma(Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical photographing system of the image capturing unit according to the 1st embodiment, when a focal length of the optical photographing system is f, an f-number of the optical photographing system is Fno, and half of a maximum field of view of the optical photographing system is HFOV, these parameters have the following values: f=15.21 millimeters (mm), Fno=2.00, HFOV=9.6 degrees (deg.).

When an Abbe number of a lens element of the optical photographing system is V, a refractive index of the lens element of the optical photographing system is N, and a minimum value among ratios of the Abbe number to the refractive index of each lens element of the optical photographing system is (V/N)min, at least one lens element of the optical photographing system satisfies the following condition: (V/N)min=13.7. In this embodiment, among the first lens element 110, the second lens element 120, the third lens element 130 and the fourth lens element 140, the ratio of the Abbe number to the refractive index of the second lens element 120 is smaller than the ratios of the Abbe number to the refractive index of the other lens elements, and (V/N)min is equal to the ratio of the Abbe number to the refractive index of the second lens element 120.

When a minimum value among Abbe numbers of all lens elements of the optical photographing system is Vmin, the following condition is satisfied: Vmin=22.4. In this embodiment, among the first lens element 110, the second lens element 120, the third lens element 130 and the fourth lens element 140, the Abbe number of the second lens element 120 is smaller than the Abbe numbers of the other lens elements, and Vmin is equal to the Abbe number of the second lens element 120.

When a central thickness of the first lens element 110 is CT1, and a sum of central thicknesses of all lens elements of the optical photographing system is ΣCT, the following condition is satisfied: CT1/(ΣCT−CT1)=2.46. In this embodiment, ΣCT is the sum of the central thicknesses of the first lens element 110, the second lens element 120, the third lens element 130 and the fourth lens element 140.

When the sum of central thicknesses of all lens elements of the optical photographing system is ΣCT, and an axial distance between the second reflective surface 113 and the image surface 160 is TL, the following condition is satisfied: ΣCT/TL=0.70.

When the axial distance between the second reflective surface 113 and the image surface 160 is TL, the following condition is satisfied: TL=5.70 [mm].

When a maximum value among all chief ray angles CRA on the image surface 160 of the optical photographing system is CRAmax, the following condition is satisfied: CRAmax=28.38 [deg.].

When a minimum value among relative illuminances of all fields of view of the optical photographing system is RImin, the following condition is satisfied: RImin=85.60%.

When an outer effective radius of the first refractive surface 111 is YR1o, the following condition is satisfied: YR1o=4.25 [mm].

When an inner effective radius of the first refractive surface 111 is YR1i, the following condition is satisfied: YR1i=2.08 [mm].

When an outer effective radius of the first reflective surface 112 is YM1o, the following condition is satisfied: YM1o=3.95 [mm].

When an inner effective radius of the first reflective surface 112 is YM1i, the following condition is satisfied: YM1i=2.70 [mm].

When a maximum effective radius of the second reflective surface 113 is YM2, the following condition is satisfied: YM2=2.08 [mm].

When a maximum effective radius of the second refractive surface 114 is YR2, the following condition is satisfied: YR2=1.93 [mm].

When the focal length of the optical photographing system is f, and a curvature radius of an object-side surface of a last lens element (i.e. the object-side surface 141 of the fourth lens element 140 in this embodiment) is RLO, the following condition is satisfied: f/RLO=−0.72.

When the axial distance between the second reflective surface 113 and the image surface 160 is TL, and the focal length of the optical photographing system is f, the following condition is satisfied: TL/f=0.38.

When the axial distance between the second reflective surface 113 and the image surface 160 is TL, and the outer effective radius of the first refractive surface 111 is YR1o, the following condition is satisfied: TL/YR1o=1.34.

When the outer effective radius of the first refractive surface 111 is YR1o, and a maximum image height of the optical photographing system is ImgH, the following condition is satisfied: YR1o/ImgH=1.62.

When the outer effective radius of the first refractive surface 111 is YR1o, and the inner effective radius of the first refractive surface 111 is YR1i, the following condition is satisfied: YR1o/YR1i=2.04.

When the maximum effective radius of the second refractive surface 114 is YR2, and a maximum effective radius of an image-side surface of the last lens element (i.e. the image-side surface 142 of the fourth lens element 140 in this embodiment) is YLI, the following condition is satisfied: YR2/YLI=0.79.

When the outer effective radius of the first reflective surface 112 is YM1o, and the inner effective radius of the first reflective surface 112 is YM1i, the following condition is satisfied: YM1o/YM1i=1.46.

When the maximum image height of the optical photographing system is ImgH, and the inner effective radius of the first reflective surface 112 is YM1i, the following condition is satisfied: ImgH/YM1i=0.97.

When an axial distance between the image-side surface of the last lens element (i.e. the image-side surface 142 of the fourth lens element 140 in this embodiment) and the image surface 160 is BL, and the maximum effective radius of the second reflective surface 113 is YM2, the following condition is satisfied: BL/YM2=0.39.

When the inner effective radius of the first reflective surface 112 is YM1i, and the maximum effective radius of the second refractive surface 114 is YR2, the following condition is satisfied: YM1i/YR2=1.40.

When the maximum image height of the optical photographing system is ImgH, and the focal length of the optical photographing system is f, the following condition is satisfied: ImgH/f=0.17.

When the inner effective radius of the first reflective surface 112 is YM1i, the maximum effective radius of the second refractive surface 114 is YR2, and a displacement in parallel with the optical axis from an outer effective radius position of the first reflective surface 112 to an axial vertex of the second refractive surface 114 is TM1R2, the following condition is satisfied: (YM1i−YR2)/TM1R2=−0.41.

When a vertical distance between one of the inflection points on the image-side surface 122 of the second lens element 120 and the optical axis is Yinf22, and the maximum effective radius of the second reflective surface 113 is YM2, the following condition is satisfied: Yinf22/YM2=0.21; and 0.89.

When a vertical distance between one of the inflection points on the object-side surface 131 of the third lens element 130 and the optical axis is Yinf31, and the maximum effective radius of the second reflective surface 113 is YM2, the following condition is satisfied: Yinf31/YM2=0.12; 0.48; and 0.64.

When a vertical distance between one of the inflection points on the image-side surface 132 of the third lens element 130 and the optical axis is Yinf32, and the maximum effective radius of the second reflective surface 113 is YM2, the following condition is satisfied: Yinf32/YM2=0.04; 0.42; and 0.84.

When a vertical distance between one of the inflection points on the object-side surface 141 of the fourth lens element 140 and the optical axis is Yinf41, and the maximum effective radius of the second reflective surface 113 is YM2, the following condition is satisfied: Yinf41/YM2=0.31; and 0.92.

When a vertical distance between the inflection point on the image-side surface 142 of the fourth lens element 140 and the optical axis is Yinf42, and the maximum effective radius of the second reflective surface 113 is YM2, the following condition is satisfied: Yinf42/YM2=0.63.

When a vertical distance between the critical point on the image-side surface 122 of the second lens element 120 and the optical axis is Yc22, and the axial distance between the second reflective surface 113 and the image surface 160 is TL, the following condition is satisfied: Yc22/TL=0.14.

When a vertical distance between the critical point on the object-side surface 131 of the third lens element 130 and the optical axis is Yc31, and the axial distance between the second reflective surface 113 and the image surface 160 is TL, the following condition is satisfied: Yc31/TL=0.08.

When a vertical distance between one of the critical points on the image-side surface 132 of the third lens element 130 and the optical axis is Yc32, and the axial distance between the second reflective surface 113 and the image surface 160 is TL, the following condition is satisfied: Yc32/TL=0.03; 0.22; and 0.35.

When a vertical distance between one of the critical points on the object-side surface 141 of the fourth lens element 140 and the optical axis is Yc41, and the axial distance between the second reflective surface 113 and the image surface 160 is TL, the following condition is satisfied: Yc41/TL=0.17; and 0.37.

When a vertical distance between the critical point on the image-side surface 142 of the fourth lens element 140 and the optical axis is Yc42, and the axial distance between the second reflective surface 113 and the image surface 160 is TL, the following condition is satisfied: Yc42/TL=0.31.

The detailed optical data of the 1st embodiment are shown in Table 1 and the aspheric surface data are shown in Table 2 below.

TABLE 1

1st Embodiment
f = 15.21 mm, Fno = 2.00, HFOV = 9.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 79.640 | (ASP) | 5.500 | Plastic | 1.537 | 55.9 | — |
| 2 | Ape. Stop | −15.833 | (ASP) | −5.200 | Plastic | 1.537 | 55.9 | — |
| 3 | | −7.855 | (ASP) | 2.825 | Plastic | 1.537 | 55.9 | — |
| 4 | | −12.392 | (ASP) | 0.775 | | | | |
| 5 | Lens 2 | −12.725 | (ASP) | 0.400 | Plastic | 1.641 | 22.4 | −6.80 |
| 6 | | 6.710 | (ASP) | 0.100 | | | | |
| 7 | Lens 3 | 7.909 | (ASP) | 0.400 | Plastic | 1.537 | 55.9 | 16.08 |
| 8 | | 92.435 | (ASP) | 0.050 | | | | |
| 9 | Lens 4 | −21.269 | (ASP) | 0.350 | Plastic | 1.544 | 55.9 | −7.53 |
| 10 | | 5.106 | (ASP) | 0.400 | | | | |
| 11 | Filter | Plano | | 0.210 | Glass | 1.517 | 64.2 | — |
| 12 | | Plano | | 0.193 | | | | |
| 13 | Image | Plano | | — | | | | |

Note:
Reference wavelength is 587.6 nm (d-line).
Surface 2 is the first reflective surface 112.
Surface 3 is the second reflective surface 113.

TABLE 2

Aspheric Coefficients

| | Surface # | | | | |
|---|---|---|---|---|---|
| | 1 | 2 | 3 | 4 | 5 |
| k = | 2.2195E+01 | 1.1353E+00 | 5.1272E−01 | −1.0000E+00 | 3.4098E+01 |
| A4 = | −5.1911E−04 | −4.6326E−05 | −5.7679E−04 | −1.2054E−02 | −2.7491E−02 |
| A6 = | −3.6136E−06 | 1.6002E−07 | 3.3632E−05 | −3.1447E−04 | −5.3197E−02 |
| A8 = | — | — | — | 5.5028E−05 | 3.0263E−02 |
| A10 = | — | — | — | — | −7.1733E−03 |
| A12 = | — | — | — | — | 8.9327E−04 |
| A14 = | — | — | — | — | −5.6626E−05 |
| A16 = | — | — | — | — | 1.4285E−06 |

TABLE 2-continued

Aspheric Coefficients

| | Surface # | | | | |
|---|---|---|---|---|---|
| | 6 | 7 | 8 | 9 | 10 |
| k = | −4.5386E+01 | −9.9000E+01 | 9.0000E+01 | −1.8505E+00 | −9.9000E+01 |
| A4 = | −5.4565E−02 | −1.7185E−01 | −1.1377E−01 | −5.0536E−02 | −5.1270E−02 |
| A6 = | 4.5112E−03 | 1.4524E−01 | 9.8252E−02 | 9.9827E−02 | 6.6094E−02 |
| A8 = | 1.4114E−03 | −5.8701E−02 | −3.2963E−02 | −6.3525E−02 | −3.4732E−02 |
| A10 = | −5.0475E−04 | 1.2925E−02 | 4.6707E−03 | 2.0262E−02 | 9.4190E−03 |
| A12 = | 9.8017E−05 | −1.6613E−03 | 3.1744E−05 | −3.4454E−03 | −1.4321E−03 |
| A14 = | −9.8311E−06 | 1.1540E−04 | −8.2488E−05 | 2.9480E−04 | 1.1638E−04 |
| A16 = | 3.8081E−07 | −3.3201E−06 | 6.3024E−06 | −9.9320E−06 | −3.9438E−06 |

In Table 1, the curvature radius, the thickness and the focal length are shown in millimeters (mm). Surface numbers 0-13 represent the surfaces sequentially passed by the optical path in the photographing system. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
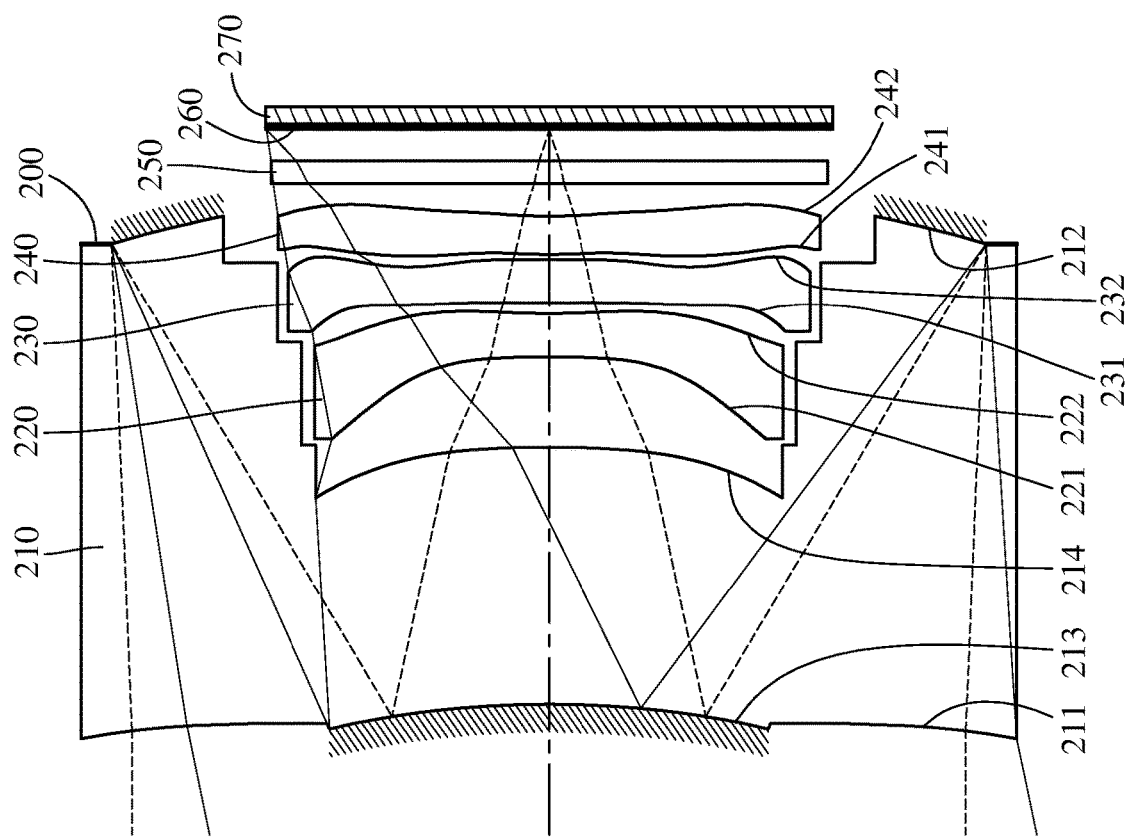
FIG. 3 is a schematic view of an image capturing unit according to the 2nd embodiment of the present disclosure.
Figure 4:
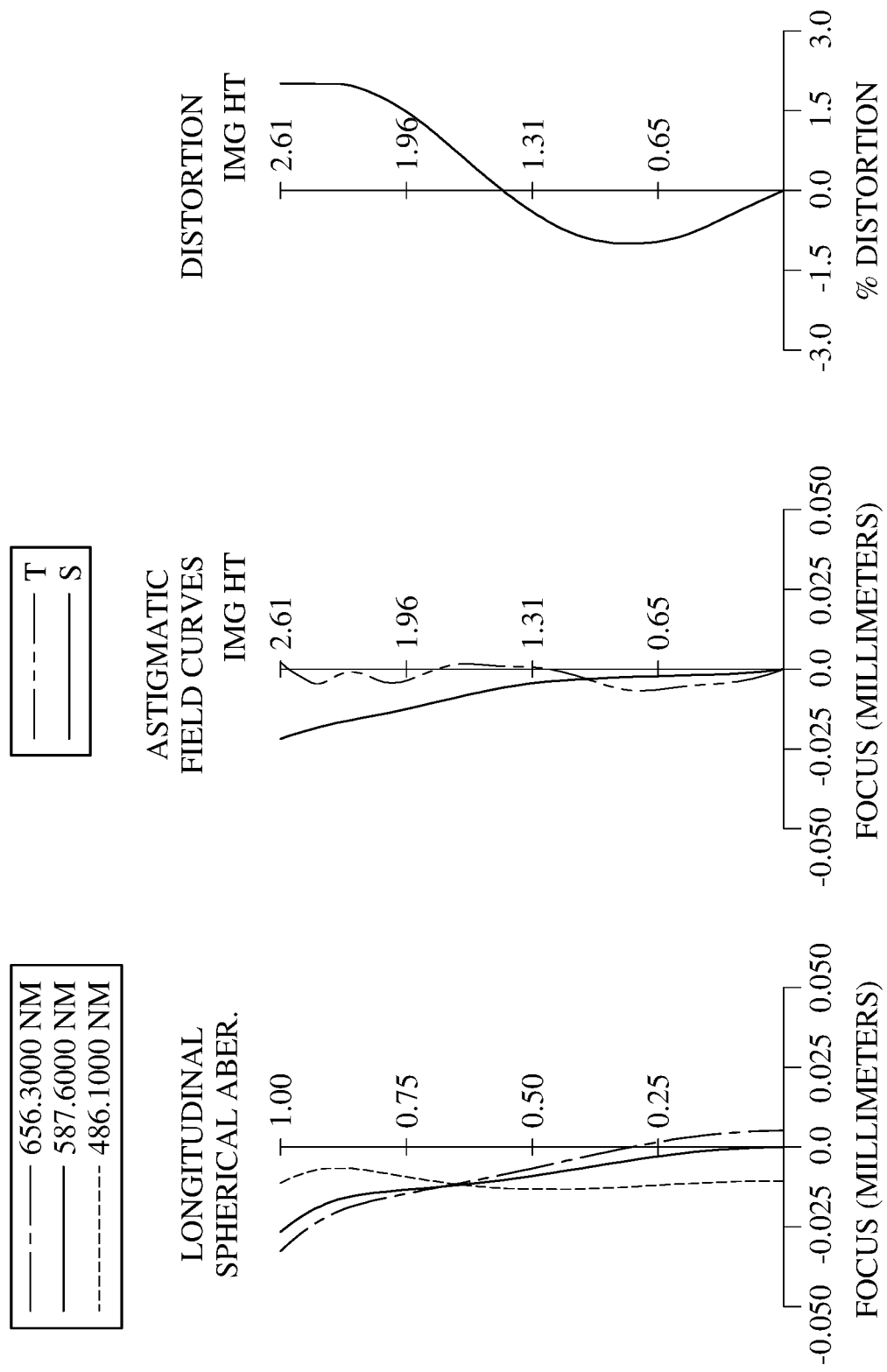
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical photographing system (its reference numeral is omitted) of the present disclosure and an image sensor 270. The optical photographing system includes, in order of an optical path sequentially passing by, a first lens element 210, an aperture stop 200, a second lens element 220, a third lens element 230, a fourth lens element 240, a filter 250 and an image surface 260. The optical photographing system includes four lens elements (210, 220, 230 and 240) with no additional lens element disposed between each of the adjacent four lens elements.

The first lens element 210 has a first refractive surface 211 being convex in a paraxial region thereof, a first reflective surface 212 being concave in a paraxial region thereof, a second reflective surface 213 being convex in a paraxial region thereof and a second refractive surface 214 being convex in a paraxial region thereof. The first refractive surface 211 faces toward an object side and is in a peripheral area of an object-side surface (its reference numeral is omitted) of the first lens element 210. The first reflective surface 212 faces toward the object side and is in a peripheral area of an image-side surface (its reference numeral is omitted) of the first lens element 210. The second reflective surface 213 faces toward an image side and is in a central area of the object-side surface of the first lens element 210. The second refractive surface 214 faces toward the image side and is in a central area of the image-side surface of the first lens element 210. The first lens element 210 is made of plastic material and has the first refractive surface 211, the first reflective surface 212, the second reflective surface 213 and the second refractive surface 214 being all aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point. The image-side surface 222 of the second lens element 220 has two inflection points and has one critical point in an off-axis region thereof.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has three inflection points and has three critical points in an off-axis region thereof. The image-side surface 232 of the third lens element 230 has three inflection points and has three critical points in an off-axis region thereof.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has three inflection points and has three critical points in an off-axis region thereof. The image-side surface 242 of the fourth lens element 240 has three inflection points and has one critical point in an off-axis region thereof.

The filter 250 is made of glass material and located between the fourth lens element 240 and the image surface 260, and will not affect the focal length of the optical photographing system. The image sensor 270 is disposed on or near the image surface 260 of the optical photographing system.

When a vertical distance between the inflection point on the object-side surface 221 of the second lens element 220 and an optical axis is Yinf21, and a maximum effective radius of the second reflective surface 213 is YM2, the following condition is satisfied: Yinf21/YM2=0.95.

The detailed optical data of the 2nd embodiment are shown in Table 3 and the aspheric surface data are shown in Table 4 below.

TABLE 3

2nd Embodiment
f = 12.29 mm, Fno = 1.60, HFOV = 11.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 59.872 | (ASP) | 5.000 | Plastic | 1.537 | 55.9 | — |
| 2 | Ape. Stop | −15.779 | (ASP) | −4.800 | Plastic | 1.537 | 55.9 | — |
| 3 | | −9.745 | (ASP) | 2.370 | Plastic | 1.537 | 55.9 | |
| 4 | | −11.558 | (ASP) | 0.830 | | | | |
| 5 | Lens 2 | −19.051 | (ASP) | 0.400 | Plastic | 1.657 | 20.7 | −7.40 |
| 6 | | 6.575 | (ASP) | 0.100 | | | | |
| 7 | Lens 3 | 15.360 | (ASP) | 0.400 | Plastic | 1.537 | 55.9 | −59.24 |
| 8 | | 10.264 | (ASP) | 0.050 | | | | |
| 9 | Lens 4 | 3.998 | (ASP) | 0.350 | Plastic | 1.552 | 49.3 | −44.97 |
| 10 | | 3.336 | (ASP) | 0.300 | | | | |
| 11 | Filter | Plano | | 0.210 | Glass | 1.517 | 64.2 | — |
| 12 | | Plano | | 0.293 | | | | |
| 13 | Image | Plano | | — | | | | |

Note:
Reference wavelength is 587.6 nm (d-line).
Surface 2 is the first reflective surface 212.
Surface 3 is the second reflective surface 213.

TABLE 4

Aspheric Coefficients

| | | | Surface # | | |
|---|---|---|---|---|---|
| | 1 | 2 | 3 | 4 | 5 |
| k = | 8.3906E+01 | 1.2080E+00 | 3.9896E+00 | 7.5457E+00 | 5.7349E+01 |
| A4 = | −7.3610E−04 | −8.7134E−05 | −5.1262E−04 | −1.3996E−02 | −5.5907E−02 |
| A6 = | −6.6123E−06 | 2.6397E−07 | 1.9303E−05 | 1.8748E−04 | −1.9008E−02 |
| A8 = | — | — | — | 6.0602E−05 | 1.3500E−02 |
| A10 = | — | — | — | — | −2.8586E−03 |
| A12 = | — | — | — | — | 2.7420E−04 |
| A14 = | — | — | — | — | −1.0011E−05 |

| | | | Surface # | | |
|---|---|---|---|---|---|
| | 6 | 7 | 8 | 9 | 10 |
| k = | −9.9000E+01 | 4.5641E+01 | −7.8800E+01 | −9.9000E+01 | −9.9000E+01 |
| A4 = | −4.6348E−02 | −8.5399E−02 | −2.0471E−01 | −2.1824E−01 | −6.0040E−02 |
| A6 = | 2.1262E−03 | 5.2422E−02 | 1.6730E−01 | 2.2293E−01 | 5.9393E−02 |
| A8 = | 3.6087E−03 | −1.0710E−02 | −5.8911E−02 | −1.0681E−01 | −2.5545E−02 |
| A10 = | −1.4790E−03 | −7.3069E−04 | 1.0554E−02 | 2.8568E−02 | 5.7774E−03 |
| A12 = | 2.8208E−04 | 5.2114E−04 | −8.2074E−04 | −4.3167E−03 | −7.3771E−04 |
| A14 = | −2.4978E−05 | −6.9577E−05 | −6.9627E−06 | 3.4137E−04 | 5.0690E−05 |
| A16 = | 8.2747E−07 | 3.1725E−06 | 3.2283E−06 | −1.0925E−05 | −1.4631E−06 |

In the 2nd embodiment, the equation of the aspheric surface profiles of the aforementioned lens elements is the same as the equation of the 1st embodiment. Also, except for the Yinf21 mentioned in this embodiment, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 12.29 | YR1o/YR1i | 2.13 |
| Fno | 1.60 | YR2/YLI | 0.86 |
| HFOV [deg.] | 11.8 | YM1o/YM1i | 1.34 |
| (V/N)min | 12.5 | ImgH/YM1i | 0.87 |
| Vmin | 20.7 | BL/YM2 | 0.40 |
| CT1/(ΣCT-CT1) | 2.06 | YM1i/YR2 | 1.40 |
| ΣCT/TL | 0.66 | ImgH/f | 0.21 |
| TL [mm] | 5.30 | (YM1i-YR2)/TM1R2 | −0.46 |
| CRAmax [deg.] | 26.86 | Yinf21/YM2 | 0.95 |
| RImin [%] | 78.50 | Yinf22/YM2 | 0.21; 0.93 |
| YR1o [mm] | 4.31 | Yinf31/YM2 | 0.13; 0.48; 0.71 |
| YR1i [mm] | 2.02 | Yinf32/YM2 | 0.10; 0.46; 0.88 |
| YM1o [mm] | 4.03 | Yinf41/YM2 | 0.13; 0.44; 0.99 |
| YM1i [mm] | 3.00 | Yinf42/YM2 | 0.20; 0.41; 0.70 |
| YM2 [mm] | 2.02 | Yc22/TL | 0.14 |
| YR2 [mm] | 2.15 | Yc31/TL | 0.09; 0.26; 0.28 |
| f/RLO | 3.07 | Yc32/TL | 0.07; 0.25; 0.39 |
| TL/f | 0.43 | Yc41/TL | 0.10; 0.23; 0.42 |
| TL/YR1o | 1.23 | Yc42/TL | 0.35 |
| YR1o/ImgH | 1.65 | — | — |

3rd Embodiment

Figure 5:
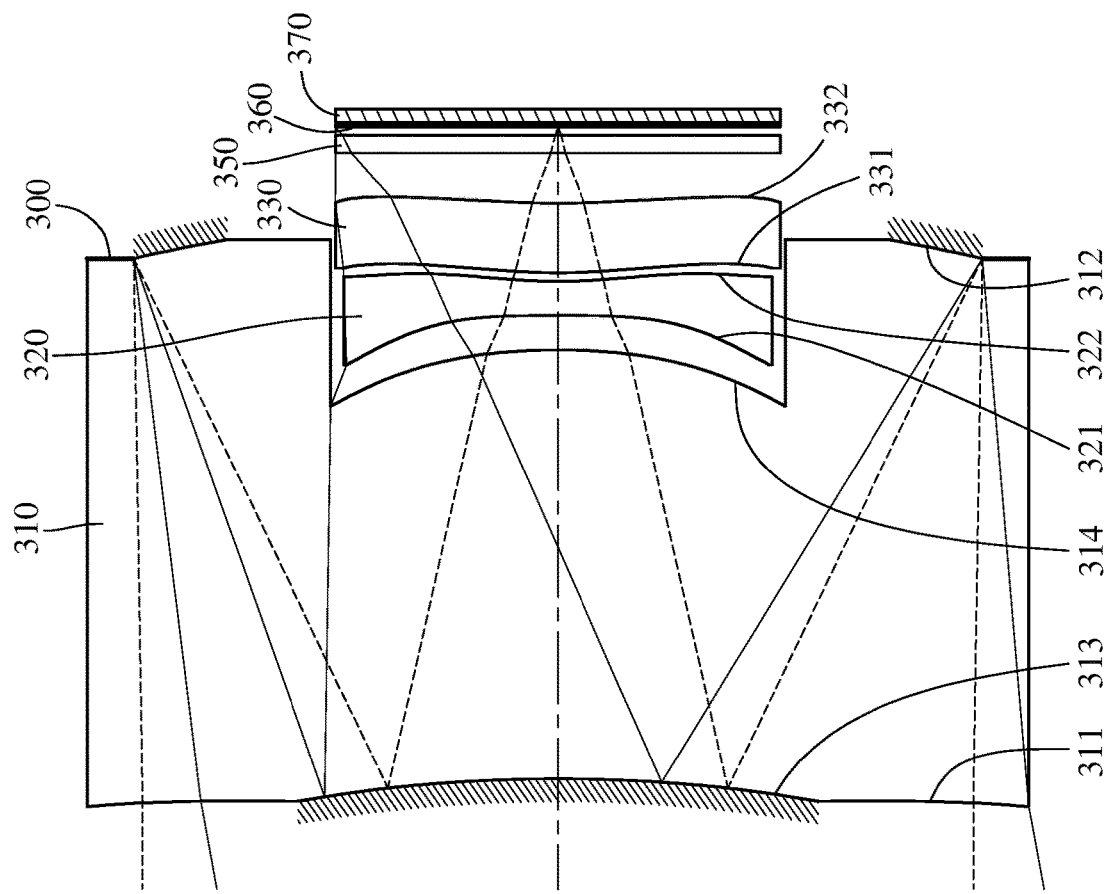
FIG. 5 is a schematic view of an image capturing unit according to the 3rd embodiment of the present disclosure.
Figure 6:
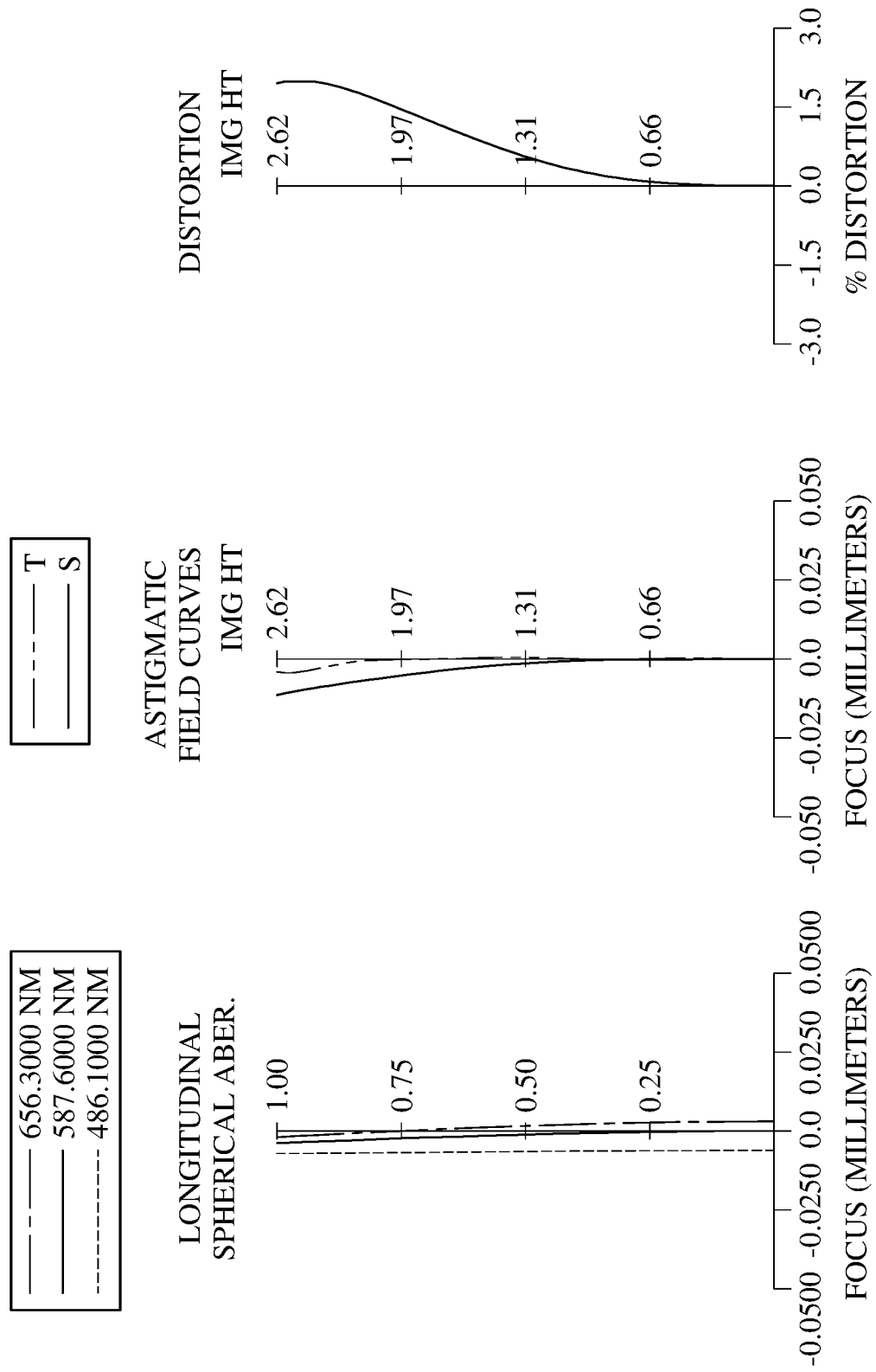
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical photographing system (its reference numeral is omitted) of the present disclosure and an image sensor 370. The optical photographing system includes, in order of an optical path sequentially passing by, a first lens element 310, an aperture stop 300, a second lens element 320, a third lens element 330, a filter 350 and an image surface 360. The optical photographing system includes three lens elements (310, 320 and 330) with no additional lens element disposed between each of the adjacent three lens elements.

The first lens element 310 has a first refractive surface 311 being convex in a paraxial region thereof, a first reflective surface 312 being concave in a paraxial region thereof, a second reflective surface 313 being convex in a paraxial region thereof and a second refractive surface 314 being convex in a paraxial region thereof. The first refractive surface 311 faces toward an object side and is in a peripheral area of an object-side surface (its reference numeral is omitted) of the first lens element 310. The first reflective surface 312 faces toward the object side and is in a peripheral area of an image-side surface (its reference numeral is omitted) of the first lens element 310. The second reflective surface 313 faces toward an image side and is in a central area of the object-side surface of the first lens element 310. The second refractive surface 314 faces toward the image side and is in a central area of the image-side surface of the first lens element 310. The first lens element 310 is made of plastic material and has the first refractive surface 311, the first reflective surface 312, the second reflective surface 313 and the second refractive surface 314 being all aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point. The image-side surface 322 of the second lens element 320 has two inflection points and has one critical point in an off-axis region thereof.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point and has one critical point in an off-axis region thereof. The image-side surface 332 of the third lens element 330 has one inflection point and has one critical point in an off-axis region thereof.

The filter 350 is made of glass material and located between the third lens element 330 and the image surface 360, and will not affect the focal length of the optical photographing system. The image sensor 370 is disposed on or near the image surface 360 of the optical photographing system.

The detailed optical data of the 3rd embodiment are shown in Table 5 and the aspheric surface data are shown in Table 6 below.

TABLE 5

3rd Embodiment
f = 14.02 mm, Fno = 3.40, HFOV = 10.4 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 86.350 | (ASP) | 7.000 | Plastic | 1.534 | 55.9 | — |
| 2 | Ape. Stop | −23.445 | (ASP) | −6.700 | Plastic | 1.534 | 55.9 | — |
| 3 |  | −18.875 | (ASP) | 5.066 | Plastic | 1.534 | 55.9 | — |
| 4 |  | −7.717 | (ASP) | 0.405 |  |  |  |  |
| 5 | Lens 2 | −30.591 | (ASP) | 0.400 | Plastic | 1.669 | 19.4 | −7.28 |
| 6 |  | 5.822 | (ASP) | 0.100 |  |  |  |  |
| 7 | Lens 3 | 6.300 | (ASP) | 0.819 | Plastic | 1.544 | 56.0 | 29.83 |
| 8 |  | 9.826 | (ASP) | 0.600 |  |  |  |  |
| 9 | Filter | Plano |  | 0.210 | Glass | 1.517 | 64.2 | — |
| 10 |  | Plano |  | 0.102 |  |  |  |  |
| 11 | Image | Plano |  | — |  |  |  |  |

Note:
Reference wavelength is 587.6 nm (d-line).
Surface 2 is the first reflective surface 312.
Surface 3 is the second reflective surface 313.

TABLE 6

Aspheric Coefficients

| Surface # | | | | |
|---|---|---|---|---|
|  | 1 | 2 | 3 | 4 |
| k = | −9.9000E+01 | 1.6097E+00 | 9.0813E+00 | −1.2305E+00 |
| A4 = | −1.7176E−04 | −1.7955E−05 | — | −6.4020E−03 |
| A6 = | −9.3420E−07 | 7.2475E−10 | — | 3.3711E−04 |

| Surface # | | | | |
|---|---|---|---|---|
|  | 6 | 7 | 8 | 9 |
| k = | −1.3807E+01 | −6.9890E+00 | −3.2001E+01 | −9.9000E+01 |
| A4 = | −2.2156E−02 | −3.1424E−02 | −2.3909E−02 | −9.5129E−03 |
| A6 = | 1.2373E−03 | 1.1536E−02 | 1.3370E−02 | 3.8826E−03 |
| A8 = | 5.3680E−05 | −3.4763E−03 | −4.1964E−03 | −8.6927E−04 |
| A10 = | 1.0875E−05 | 6.0899E−04 | 6.5951E−04 | 9.7129E−05 |
| A12 = | −2.8083E−06 | −5.2160E−05 | −4.7858E−05 | −5.5294E−06 |
| A14 = | 1.4870E−07 | 1.6985E−06 | 1.0921E−06 | 6.6665E−08 |

In the 3rd embodiment, the equation of the aspheric surface profiles of the aforementioned lens elements is the same as the equation of the 1st embodiment. Also, the definitions of these parameters shown in the following table are the same as those stated in the 1st and 2nd embodiments with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 14.02 | TL/YR1o | 1.39 |
| Fno | 3.40 | YR1o/ImgH | 2.12 |
| HFOV [deg.] | 10.4 | YR1o/YR1i | 1.81 |
| (V/N)min | 11.6 | YR2/YLI | 1.02 |
| Vmin | 19.4 | YM1o/YM1i | 1.28 |
| CT1/(ΣCT-CT1) | 4.16 | ImgH/YM1i | 0.67 |
| ΣCT/TL | 0.82 | BL/YM2 | 0.30 |
| TL [mm] | 7.70 | YM1i/YR2 | 1.46 |
| CRAmax [deg.] | 19.97 | ImgH/f | 0.19 |
| RImin [%] | 87.80 | (YM1i-YR2)/TM1R2 | −1.14 |
| YR1o [mm] | 5.55 | Yinf21/YM2 | 0.80 |
| YR1i [mm] | 3.06 | Yinf22/YM2 | 0.27; 0.70 |
| YM1o [mm] | 5.00 | Yinf31/YM2 | 0.32 |
| YM1i [mm] | 3.90 | Yinf32/YM2 | 0.31 |
| YM2 [mm] | 3.06 | Yc22/TL | 0.22 |
| YR2 [mm] | 2.68 | Yc31/TL | 0.25 |
| f/RLO | 2.23 | Yc32/TL | 0.27 |
| TL/f | 0.55 | — | — |

4th Embodiment

Figure 7:
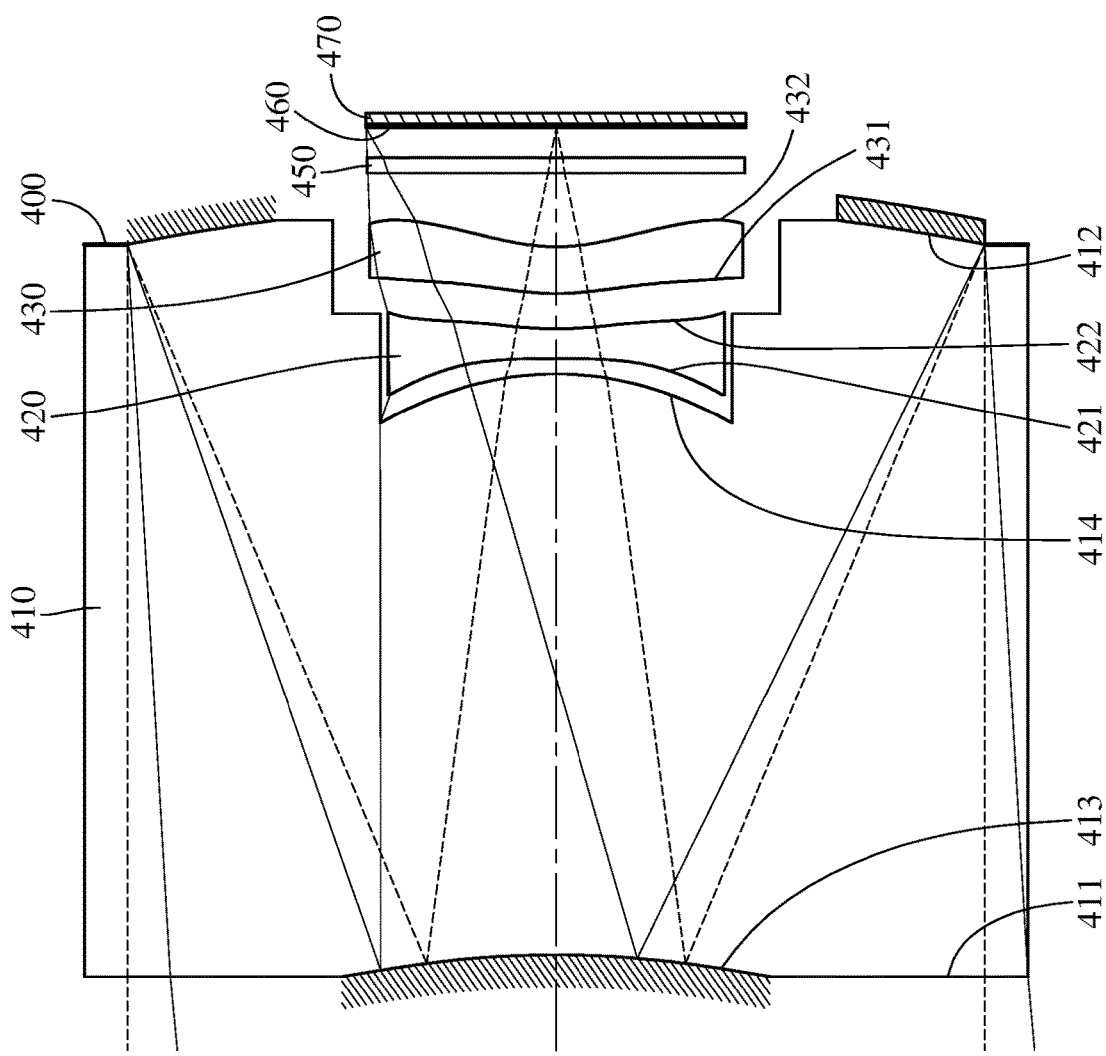
FIG. 7 is a schematic view of an image capturing unit according to the 4th embodiment of the present disclosure.
Figure 8:
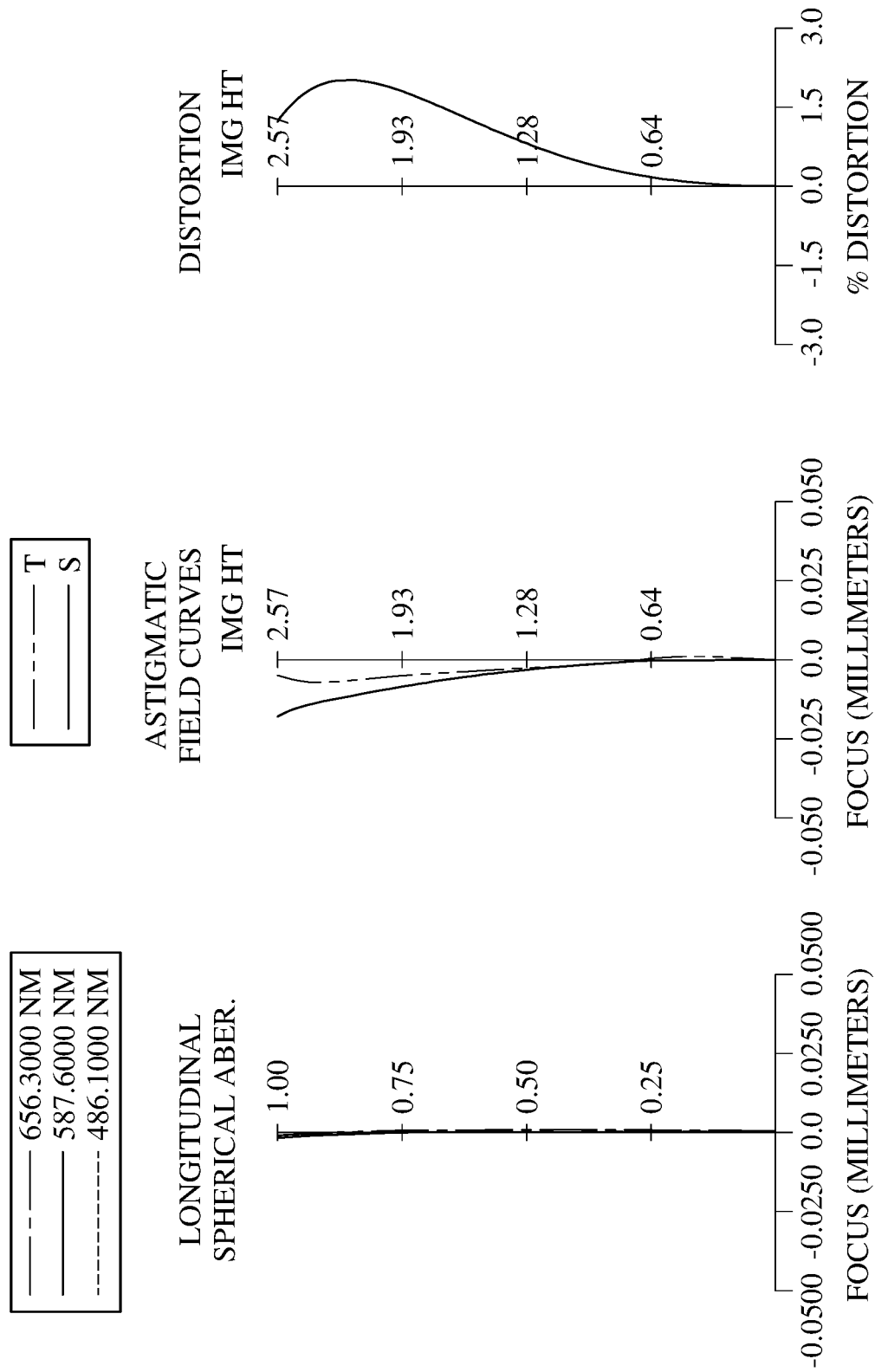
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical photographing system (its reference numeral is omitted) of the present disclosure and an image sensor 470. The optical photographing system includes, in order of an optical path sequentially passing by, a first lens element 410, an aperture stop 400, a second lens element 420, a third lens element 430, a filter 450 and an image surface 460. The optical photographing system includes three lens elements (410, 420 and 430) with no additional lens element disposed between each of the adjacent three lens elements.

The first lens element 410 has a first refractive surface 411 being planar, a first reflective surface 412 being concave in a paraxial region thereof, a second reflective surface 413 being convex in a paraxial region thereof and a second refractive surface 414 being convex in a paraxial region thereof. The first refractive surface 411 faces toward an object side and is in a peripheral area of an object-side surface (its reference numeral is omitted) of the first lens element 410. The first reflective surface 412 faces toward the object side and is in a peripheral area of an image-side surface (its reference numeral is omitted) of the first lens element 410. The second reflective surface 413 faces toward an image side and is in a central area of the object-side surface of the first lens element 410. The second refractive surface 414 faces toward the image side and is in a central area of the image-side surface of the first lens element 410. The first lens element 410 is made of plastic material and has the first reflective surface 412, the second reflective surface 413 and the second refractive surface 414 being all aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The image-side surface 422 of the second lens element 420 has two inflection points.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has three inflection points. The image-side surface 432 of the third lens element 430 has one inflection point and has one critical point in an off-axis region thereof.

The filter 450 is made of glass material and located between the third lens element 430 and the image surface 460, and will not affect the focal length of the optical photographing system. The image sensor 470 is disposed on or near the image surface 460 of the optical photographing system.

The detailed optical data of the 4th embodiment are shown in Table 7 and the aspheric surface data are shown in Table 8 below.

TABLE 7

4th Embodiment
f = 28.11 mm, Fno = 3.40, HFOV = 5.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | Plano | | 10.500 | Plastic | 1.534 | 55.9 | — |
| 2 | Ape. Stop | −28.842 | (ASP) | −10.200 | Plastic | 1.534 | 55.9 | — |
| 3 | | −12.548 | (ASP) | 7.869 | Plastic | 1.534 | 55.9 | — |
| 4 | | −4.228 | (ASP) | 0.211 | | | | |
| 5 | Lens 2 | −43.434 | (ASP) | 0.400 | Plastic | 1.584 | 28.2 | −7.07 |
| 6 | | 4.580 | (ASP) | 0.477 | | | | |
| 7 | Lens 3 | 3.427 | (ASP) | 0.629 | Plastic | 1.544 | 56.0 | −19.25 |
| 8 | | 2.415 | (ASP) | 1.000 | | | | |
| 9 | Filter | Plano | | 0.210 | Glass | 1.517 | 64.2 | — |
| 10 | | Plano | | 0.404 | | | | |
| 11 | Image | Plano | | — | | | | |

Note:
Reference wavelength is 587.6 nm (d-line).
Surface 2 is the first reflective surface 412.
Surface 3 is the second reflective surface 413.

TABLE 8

Aspheric Coefficients

| Surface # | | | | |
|---|---|---|---|---|
| | 2 | 3 | 4 | 5 |
| k = | −1.0119E+00 | −7.4627E+00 | −1.0427E+00 | 1.0000E+01 |
| A4 = | 1.8153E−06 | 8.9167E−06 | — | −3.7475E−02 |
| A6 = | — | — | — | 5.8681E−03 |
| A8 = | — | — | — | −3.6226E−04 |

| Surface # | | |
|---|---|---|
| 6 | 7 | 8 |
| k = −1.7051E+01 | −1.3768E+01 | −7.4529E+00 |
| A4 = −2.6714E−02 | −2.4009E−02 | −1.3943E−02 |
| A6 = 5.4418E−03 | 4.4846E−03 | 2.4196E−03 |
| A8 = −2.2986E−04 | −2.7298E−04 | −2.9387E−04 |
| A10 = — | — | 4.8043E−06 |

In the 4th embodiment, the equation of the aspheric surface profiles of the aforementioned lens elements is the same as the equation of the 1st embodiment. Also, the definitions of these parameters shown in the following table are the same as those stated in the 1st to 3rd embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 28.11 | f/RLO | 8.20 |
| Fno | 3.40 | TL/f | 0.40 |
| HFOV [deg.] | 5.2 | TL/YR1o | 1.75 |
| (V/N)min | 17.8 | YR1o/ImgH | 2.48 |
| Vmin | 28.2 | YR1o/YR1i | 2.21 |
| CT1/(ΣCT-CT1) | 7.65 | YR2/YLI | 0.94 |
| ΣCT/TL | 0.79 | YM1o/YM1i | 1.53 |
| TL [mm] | 11.20 | ImgH/YM1i | 0.68 |
| CRAmax [deg.] | 16.98 | BL/YM2 | 0.56 |
| RImin [%] | 93.00 | YM1i/YR2 | 1.59 |
| YR1o [mm] | 6.38 | ImgH/f | 0.09 |
| YR1i [mm] | 2.89 | (YM1i-YR2)/TM1R2 | −0.81 |
| YM1o [mm] | 5.80 | Yinf22/YM2 | 0.26; 0.52 |
| YM1i [mm] | 3.80 | Yinf31/YM2 | 0.28; 0.63; 0.79 |
| YM2 [mm] | 2.89 | Yinf32/YM2 | 0.37 |
| YR2 [mm] | 2.38 | Yc32/TL | 0.19 |

5th Embodiment

Figure 9:
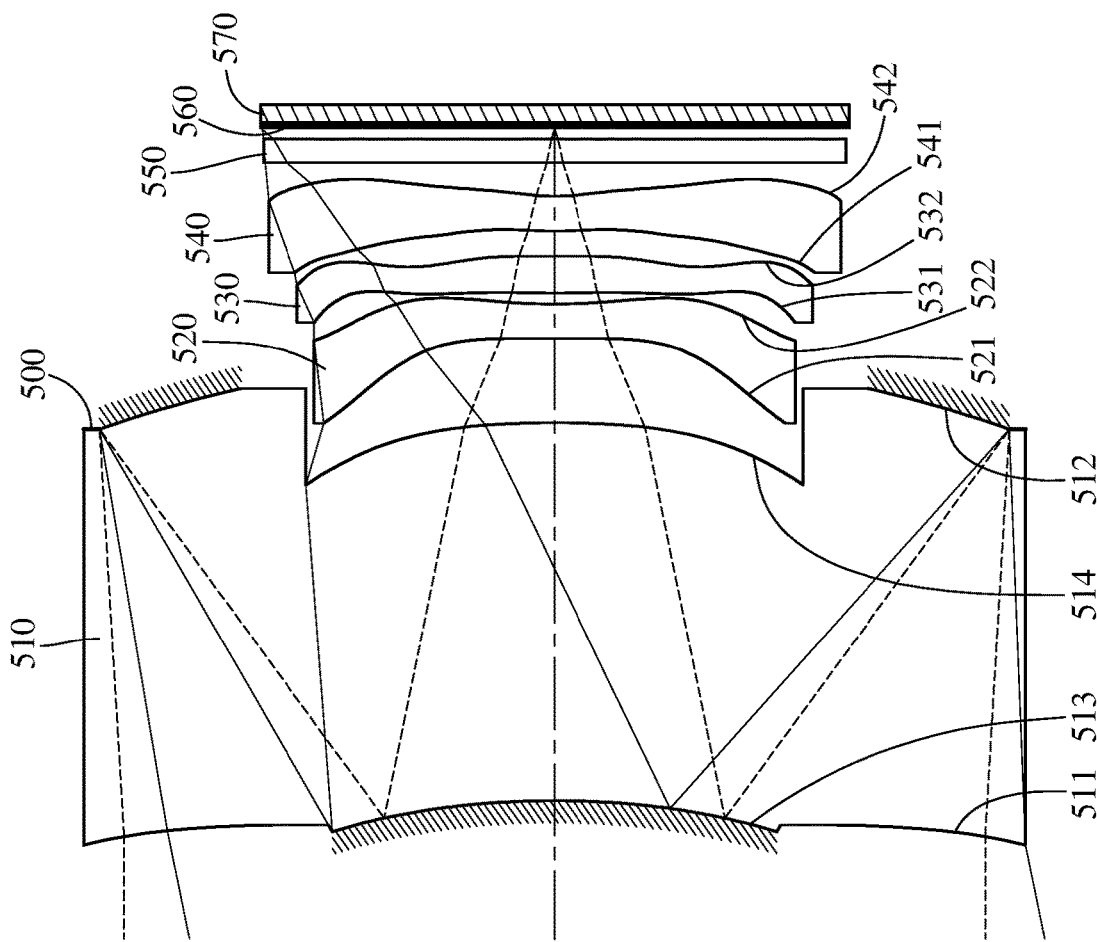
FIG. 9 is a schematic view of an image capturing unit according to the 5th embodiment of the present disclosure.
Figure 10:
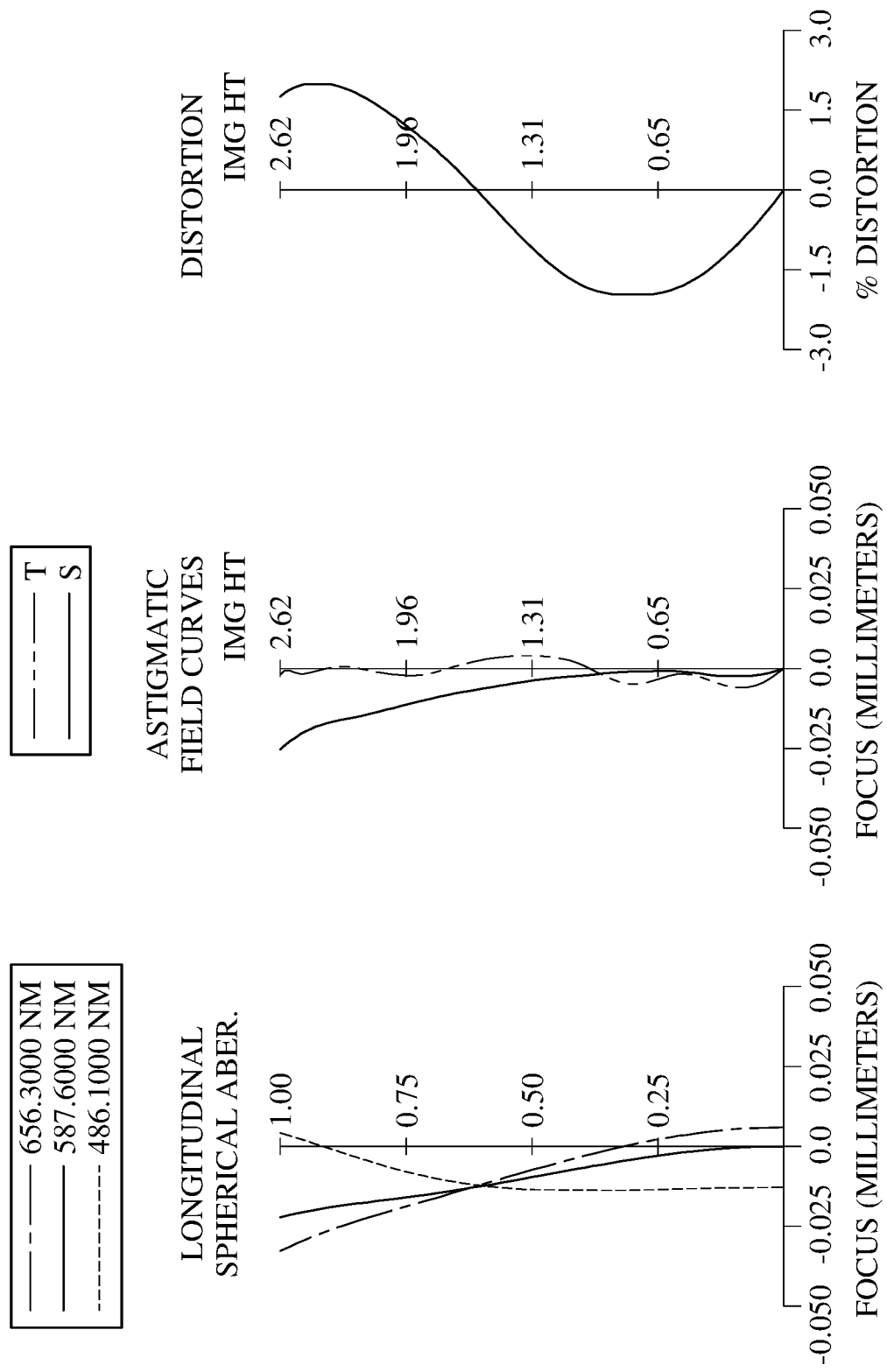
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical photographing system (its reference numeral is omitted) of the present disclosure and an image sensor 570. The optical photographing system includes, in order of an optical path sequentially passing by, a first lens element 510, an aperture stop 500, a second lens element 520, a third lens element 530, a fourth lens element 540, a filter 550 and an image surface 560. The optical photographing system includes four lens elements (510, 520, 530 and 540) with no additional lens element disposed between each of the adjacent four lens elements.

The first lens element 510 has a first refractive surface 511 being convex in a paraxial region thereof, a first reflective surface 512 being concave in a paraxial region thereof, a second reflective surface 513 being convex in a paraxial region thereof and a second refractive surface 514 being convex in a paraxial region thereof. The first refractive surface 511 faces toward an object side and is in a peripheral area of an object-side surface (its reference numeral is omitted) of the first lens element 510. The first reflective surface 512 faces toward the object side and is in a peripheral area of an image-side surface (its reference numeral is omitted) of the first lens element 510. The second reflective surface 513 faces toward an image side and is in a central area of the object-side surface of the first lens element 510. The second refractive surface 514 faces toward the image side and is in a central area of the image-side surface of the first lens element 510. The first lens element 510 is made of plastic material and has the first refractive surface 511, the first reflective surface 512, the second reflective surface 513 and the second refractive surface 514 being all aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has one inflection point. The image-side surface 522 of the second lens element 520 has two inflection points and has one critical point in an off-axis region thereof.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has three inflection points and has three critical points in an off-axis region thereof. The image-side surface 532 of the third lens element 530 has four inflection points and has three critical points in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has five inflection points and has one critical point in an off-axis region thereof. The image-side surface 542 of the fourth lens element 540 has three inflection points and has one critical point in an off-axis region thereof.

The filter 550 is made of glass material and located between the fourth lens element 540 and the image surface 560, and will not affect the focal length of the optical photographing system. The image sensor 570 is disposed on or near the image surface 560 of the optical photographing system.

The detailed optical data of the 5th embodiment are shown in Table 9 and the aspheric surface data are shown in Table 10 below.

TABLE 9

5th Embodiment
f = 12.69 mm, Fno = 1.65, HFOV = 11.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 56.144 | (ASP) | 4.226 | Plastic | 1.544 | 56.0 | — |
| 2 | Ape. Stop | −13.492 | (ASP) | −3.985 | Plastic | 1.544 | 56.0 | — |
| 3 |  | −7.671 | (ASP) | 3.376 | Plastic | 1.544 | 56.0 | — |
| 4 |  | −9.205 | (ASP) | 0.757 |  |  |  |  |
| 5 | Lens 2 | −930.825 | (ASP) | 0.307 | Plastic | 1.669 | 19.5 | −7.70 |
| 6 |  | 5.178 | (ASP) | 0.100 |  |  |  |  |
| 7 | Lens 3 | 12.004 | (ASP) | 0.325 | Plastic | 1.650 | 21.5 | 52.41 |
| 8 |  | 18.331 | (ASP) | 0.227 |  |  |  |  |
| 9 | Lens 4 | 3.134 | (ASP) | 0.311 | Plastic | 1.534 | 55.9 | −6.98 |
| 10 |  | 1.643 | (ASP) | 0.300 |  |  |  |  |
| 11 | Filter | Plano |  | 0.210 | Glass | 1.517 | 64.2 | — |
| 12 |  | Plano |  | 0.099 |  |  |  |  |
| 13 | Image | Plano |  | — |  |  |  |  |

Note:
Reference wavelength is 587.6 nm (d-line).
Surface 2 is the first reflective surface 512.
Surface 3 is the second reflective surface 513.

TABLE 10

Aspheric Coefficients

| Surface # | 1 | 2 | 3 | 4 | 5 |
|---|---|---|---|---|---|
| k = | −8.2249E+01 | 9.9776E−01 | 5.1952E+00 | 4.6394E+00 | 9.0000E+01 |
| A4 = | −7.7893E−04 | −9.9940E−05 | 3.2500E−04 | −1.1458E−02 | −2.2449E−02 |
| A6 = | −1.0088E−05 | −8.8424E−08 | 9.7231E−05 | −8.4800E−04 | −6.7805E−02 |
| A8 = | — | — | — | 2.5724E−04 | 3.7833E−02 |
| A10 = | — | — | — | −1.2356E−05 | −9.5108E−03 |
| A12 = | — | — | — | — | 1.3409E−03 |
| A14 = | — | — | — | — | −1.0198E−04 |
| A16 = | — | — | — | — | 3.2414E−06 |

| Surface # | 6 | 7 | 8 | 9 | 10 |
|---|---|---|---|---|---|
| k = | −6.0317E+00 | 5.5976E+00 | −9.9000E+01 | −7.4197E+01 | −3.3854E+01 |
| A4 = | −1.2527E−02 | −1.1293E−01 | −2.0580E−01 | −3.3857E−01 | −1.4412E−01 |
| A6 = | −3.5951E−02 | 8.0249E−02 | 1.3441E−01 | 3.8040E−01 | 1.5771E−01 |
| A8 = | 1.3168E−02 | −1.7210E−02 | −1.2739E−02 | −2.1031E−01 | −7.9814E−02 |
| A10 = | −1.8043E−03 | −1.3128E−03 | −1.3735E−02 | 6.3584E−02 | 2.2074E−02 |
| A12 = | 6.9997E−05 | 9.0263E−04 | 5.3543E−03 | −1.0664E−02 | −3.4948E−03 |
| A14 = | 7.9630E−06 | −1.1374E−04 | −7.8286E−04 | 9.2715E−04 | 2.9894E−04 |
| A16 = | −6.3864E−07 | 4.6252E−06 | 4.2050E−05 | −3.2492E−05 | −1.0759E−05 |

In the 5th embodiment, the equation of the aspheric surface profiles of the aforementioned lens elements is the same as the equation of the 1st embodiment. Also, the definitions of these parameters shown in the following table are the same as those stated in the 1st to 4th embodiments with corresponding values for the 5th embodiment, so an explanation in this regard will not be provided again.

Moreover, these parameters can be calculated from Table 9 and Table 10 as the following values and satisfy the following conditions:

5th Embodiment

| | | | |
|---|---|---|---|
| f [mm] | 12.69 | YR1o/YR1i | 2.12 |
| Fno | 1.65 | YR2/YLI | 0.87 |
| HFOV [deg.] | 11.5 | YM1o/YM1i | 1.45 |
| (V/N)min | 11.7 | ImgH/YM1i | 0.94 |
| Vmin | 19.5 | BL/YM2 | 0.31 |
| CT1/(ΣCT−CT1) | 3.58 | YM1i/YR2 | 1.26 |
| ΣCT/TL | 0.72 | ImgH/f | 0.21 |
| TL [mm] | 6.01 | (YM1i−YR2)/TM1R2 | 9.70 |
| CRAmax [deg.] | 30.21 | Yinf21/YM2 | 0.88 |
| RImin [%] | 84.40 | Yinf22/YM2 | 0.31; 0.93 |
| YR1o [mm] | 4.20 | Yinf31/YM2 | 0.13; 0.43; 0.72 |
| YR1i [mm] | 1.98 | Yinf32/YM2 | 0.08; 0.46; 0.80; 1.15 |
| YM1o [mm] | 4.06 | Yinf41/YM2 | 0.12; 0.46; 0.59; 0.88; 0.96 |
| YM1i [mm] | 2.80 | Yinf42/YM2 | 0.18; 0.42; 0.67 |
| YM2 [mm] | 1.98 | Yc22/TL | 0.17 |
| YR2 [mm] | 2.22 | Yc31/TL | 0.08; 0.19; 0.27 |
| f/RLO | 4.05 | Yc32/TL | 0.04; 0.22; 0.31 |

-continued

| 5th Embodiment | | | |
|---|---|---|---|
| TL/f | 0.47 | Yc41/TL | 0.08 |
| TL/YR1o | 1.43 | Yc42/TL | 0.30 |
| YR1o/ImgH | 1.60 | — | — |

6th Embodiment

Figure 11:
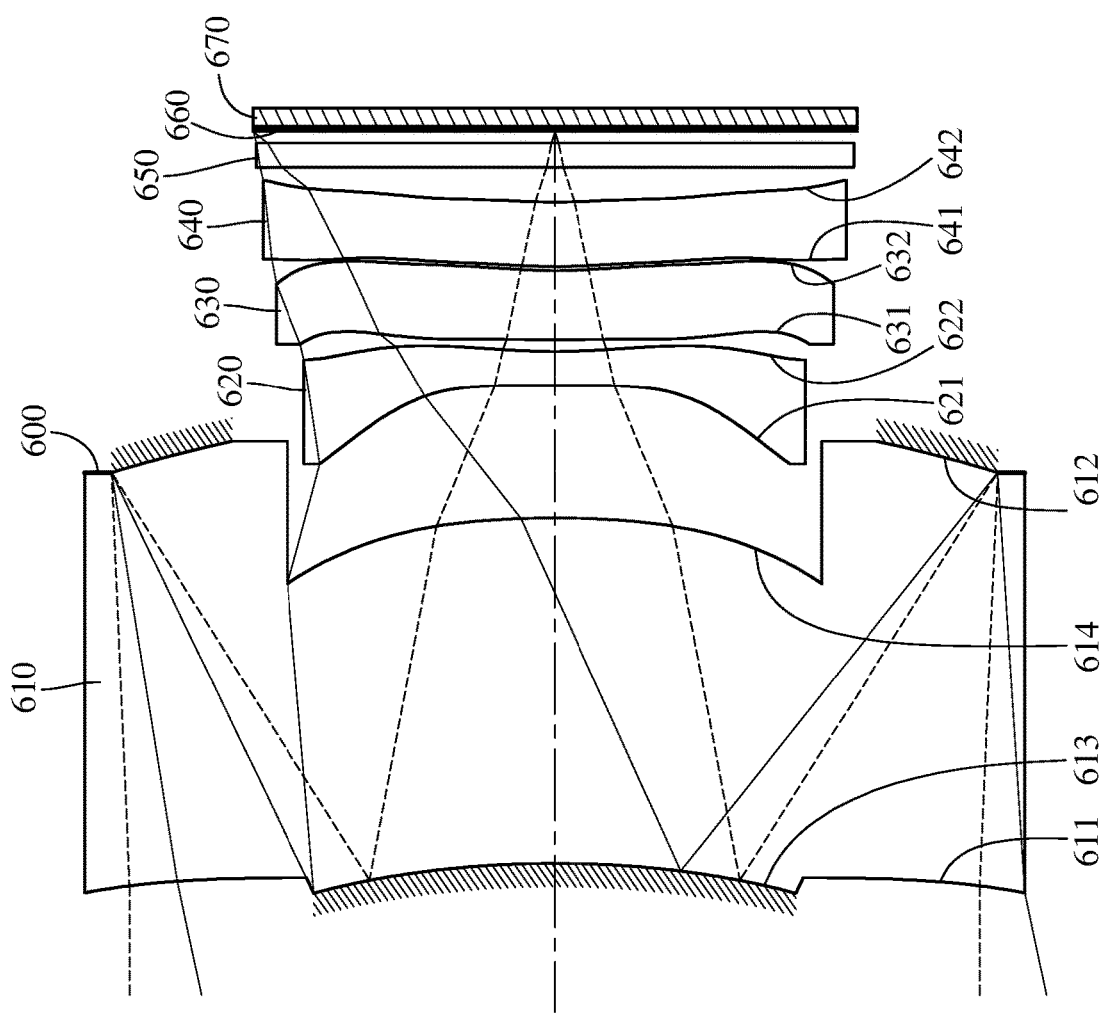
FIG. 11 is a schematic view of an image capturing unit according to the 6th embodiment of the present disclosure.
Figure 12:
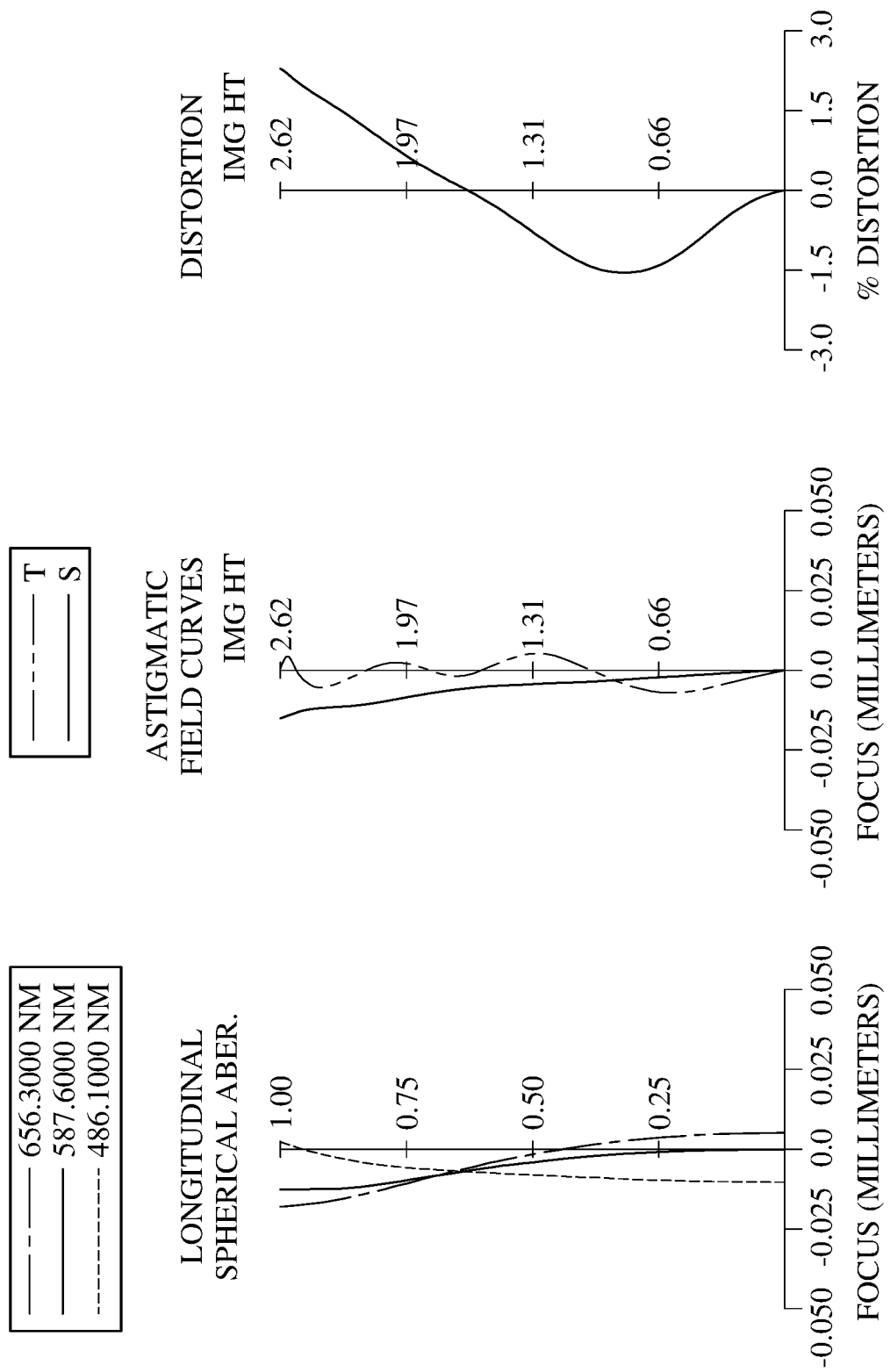
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical photographing system (its reference numeral is omitted) of the present disclosure and an image sensor 670. The optical photographing system includes, in order of an optical path sequentially passing by, a first lens element 610, an aperture stop 600, a second lens element 620, a third lens element 630, a fourth lens element 640, a filter 650 and an image surface 660. The optical photographing system includes four lens elements (610, 620, 630 and 640) with no additional lens element disposed between each of the adjacent four lens elements.

The first lens element 610 has a first refractive surface 611 being convex in a paraxial region thereof, a first reflective surface 612 being concave in a paraxial region thereof, a second reflective surface 613 being convex in a paraxial region thereof and a second refractive surface 614 being convex in a paraxial region thereof. The first refractive surface 611 faces toward an object side and is in a peripheral area of an object-side surface (its reference numeral is omitted) of the first lens element 610. The first reflective surface 612 faces toward the object side and is in a peripheral area of an image-side surface (its reference numeral is omitted) of the first lens element 610. The second reflective surface 613 faces toward an image side and is in a central area of the object-side surface of the first lens element 610. The second refractive surface 614 faces toward the image side and is in a central area of the image-side surface of the first lens element 610. The first lens element 610 is made of plastic material and has the first refractive surface 611, the first reflective surface 612, the second reflective surface 613 and the second refractive surface 614 being all aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has two inflection points and has one critical point in an off-axis region thereof. The image-side surface 622 of the second lens element 620 has two inflection points and has two critical points in an off-axis region thereof.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has three inflection points and has three critical points in an off-axis region thereof. The image-side surface 632 of the third lens element 630 has three inflection points and has one critical point in an off-axis region thereof.

The fourth lens element 640 with positive refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has six inflection points and has two critical points in an off-axis region thereof. The image-side surface 642 of the fourth lens element 640 has five inflection points.

The filter 650 is made of glass material and located between the fourth lens element 640 and the image surface 660, and will not affect the focal length of the optical photographing system. The image sensor 670 is disposed on or near the image surface 660 of the optical photographing system.

When a vertical distance between the critical point on the object-side surface 621 of the second lens element 620 and an optical axis is Yc21, and an axial distance between the second reflective surface 613 and the image surface 660 is TL, the following condition is satisfied: Yc21/TL=0.04.

The detailed optical data of the 6th embodiment are shown in Table 11 and the aspheric surface data are shown in Table 12 below.

TABLE 11

6th Embodiment
f = 12.17 mm, Fno = 1.65, HFOV = 11.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 57.834 | (ASP) | 4.097 | Plastic | 1.544 | 56.0 | — |
| 2 | Ape. Stop | −14.304 | (ASP) | −3.951 | Plastic | 1.544 | 56.0 | — |
| 3 | | −9.274 | (ASP) | 3.001 | Plastic | 1.544 | 56.0 | — |
| 4 | | −8.540 | (ASP) | 1.149 | | | | |
| 5 | Lens 2 | 65.721 | (ASP) | 0.300 | Plastic | 1.669 | 19.5 | −7.99 |
| 6 | | 4.935 | (ASP) | 0.100 | | | | |
| 7 | Lens 3 | 12.528 | (ASP) | 0.601 | Plastic | 1.650 | 21.5 | −10.96 |
| 8 | | 4.458 | (ASP) | 0.035 | | | | |
| 9 | Lens 4 | 4.509 | (ASP) | 0.559 | Plastic | 1.534 | 55.9 | 68.81 |
| 10 | | 4.918 | (ASP) | 0.300 | | | | |

TABLE 11-continued

6th Embodiment
f = 12.17 mm, Fno = 1.65, HFOV = 11.9 deg.

| Surface # | | Curvature Radius | Thickness | Material | Index | Abbe # | Focal Length |
|---|---|---|---|---|---|---|---|
| 11 | Filter | Plano | 0.210 | Glass | 1.517 | 64.2 | — |
| 12 | | Plano | 0.099 | | | | |
| 13 | Image | Plano | — | | | | |

Note:
Reference wavelength is 587.6 nm (d-line).
Surface 2 is the first reflective surface 612.
Surface 3 is the second reflective surface 613.

TABLE 12

Aspheric Coefficients

| | | | Surface # | | |
|---|---|---|---|---|---|
| | 1 | 2 | 3 | 4 | 5 |
| k = | −5.0504E+01 | 9.7029E−01 | 7.4677E+00 | 1.7044E+00 | −8.7392E+01 |
| A4 = | −7.6041E−04 | −1.0031E−04 | 3.8165E−04 | −8.5191E−03 | −4.1904E−02 |
| A6 = | −7.1014E−06 | −7.9403E−08 | 5.0085E−05 | −4.9970E−04 | −3.7127E−02 |
| A8 = | — | — | — | 1.4879E−04 | 2.1689E−02 |
| A10 = | — | — | — | −9.1932E−06 | −4.9877E−03 |
| A12 = | — | — | — | — | 6.0457E−04 |
| A14 = | — | — | — | — | −3.7928E−05 |
| A16 = | — | — | — | — | 9.7612E−07 |

| | | | Surface # | | |
|---|---|---|---|---|---|
| | 6 | 7 | 8 | 9 | 10 |
| k = | −2.4944E+00 | 2.7683E+01 | −1.1449E+01 | −2.1560E+01 | −9.9000E+01 |
| A4 = | −8.8234E−02 | −1.0597E−01 | −9.4258E−02 | −1.2882E−01 | −1.0915E−01 |
| A6 = | 5.5489E−02 | 1.1672E−01 | 5.1799E−02 | 1.3332E−01 | 1.3260E−01 |
| A8 = | −2.6761E−02 | −5.8671E−02 | −7.8888E−03 | −6.6738E−02 | −7.1372E−02 |
| A10 = | 7.5177E−03 | 1.6246E−02 | −2.6063E−03 | 1.7732E−02 | 2.0695E−02 |
| A12 = | −1.1631E−03 | −2.6157E−03 | 1.1822E−03 | −2.5683E−03 | −3.3763E−03 |
| A14 = | 9.3871E−05 | 2.2520E−04 | −1.7021E−04 | 1.9155E−04 | 2.9372E−04 |
| A16 = | −3.0688E−06 | −8.0105E−06 | 8.6899E−06 | −5.7439E−06 | −1.0637E−05 |

In the 6th embodiment, the equation of the aspheric surface profiles of the aforementioned lens elements is the same as the equation of the 1st embodiment. Also, except for the Yc21 mentioned in this embodiment, the definitions of these parameters shown in the following table are the same as those stated in the 1st to 5th embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 12.17 | YR1o/YR1i | 1.95 |
| Fno | 1.65 | YR2/YLI | 0.92 |
| HFOV [deg.] | 11.9 | YM1o/YM1i | 1.37 |
| (V/N)min | 11.7 | ImgH/YM1i | 0.94 |
| Vmin | 19.5 | BL/YM2 | 0.29 |
| CT1/(ΣCT-CT1) | 2.06 | YM1i/YR2 | 1.21 |
| ΣCT/TL | 0.70 | ImgH/f | 0.22 |
| TL [mm] | 6.35 | (YM1i-YR2)/TM1R2 | −1.24 |
| CRAmax [deg.] | 32.69 | Yinf21/YM2 | 0.08; 0.88 |
| RImin [%] | 75.40 | Yinf22/YM2 | 0.26; 0.87 |
| YR1o [mm] | 4.08 | Yinf31/YM2 | 0.14; 0.33; 0.70 |
| YR1i [mm] | 2.09 | Yinf32/YM2 | 0.23; 0.48; 0.69 |
| YM1o [mm] | 3.84 | Yinf41/YM2 | 0.21; 0.37; 0.59; 0.89; 1.11; 1.15 |
| YM1i [mm] | 2.80 | Yinf42/YM2 | 0.17; 0.35; 0.66; 0.87; 1.17 |
| YM2 [mm] | 2.09 | Yc21/TL | 0.04 |
| YR2 [mm] | 2.32 | Yc22/TL | 0.18; 0.34 |
| f/RLO | 2.70 | Yc31/TL | 0.10; 0.12; 0.28 |
| TL/f | 0.52 | Yc32/TL | 0.28 |
| TL/YR1o | 1.56 | Yc41/TL | 0.25; 0.34 |
| YR1o/ImgH | 1.56 | — | |

7th Embodiment

Figure 13:
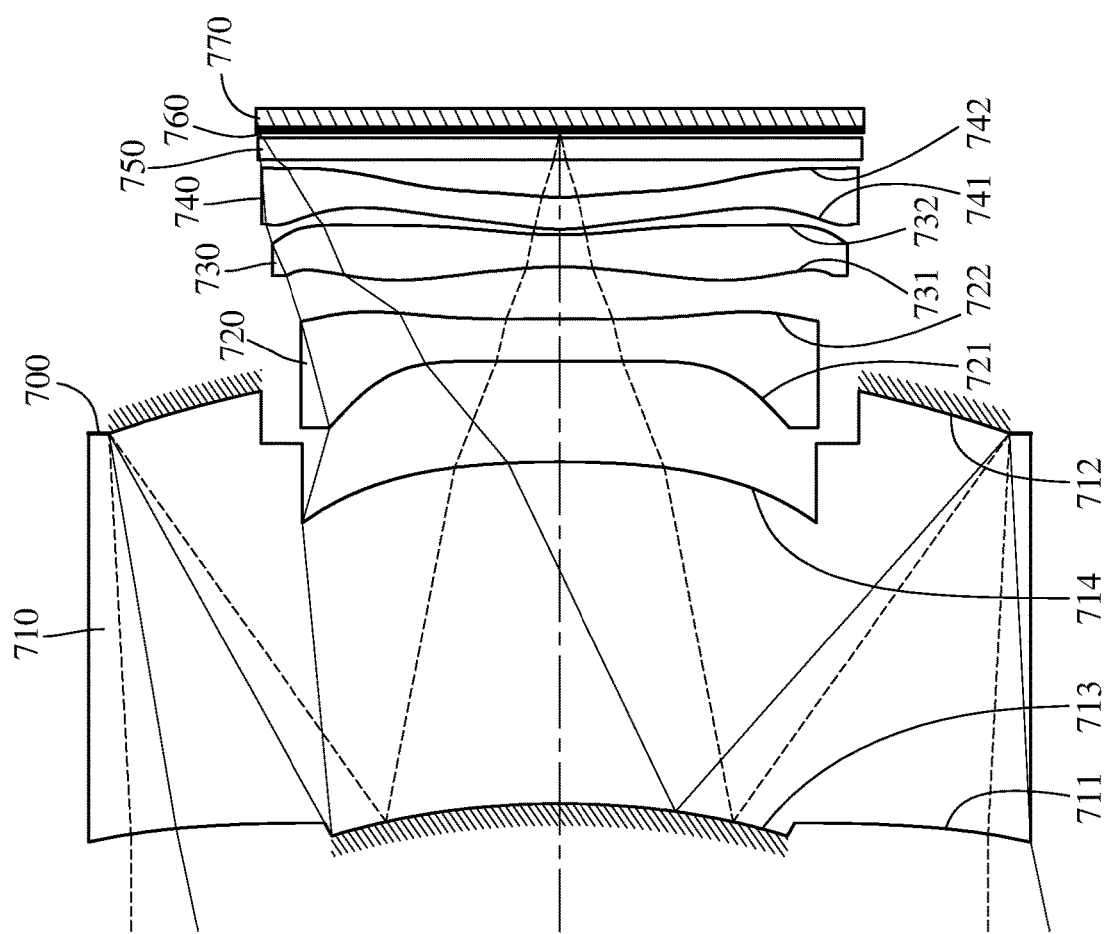
FIG. 13 is a schematic view of an image capturing unit according to the 7th embodiment of the present disclosure.
Figure 14:
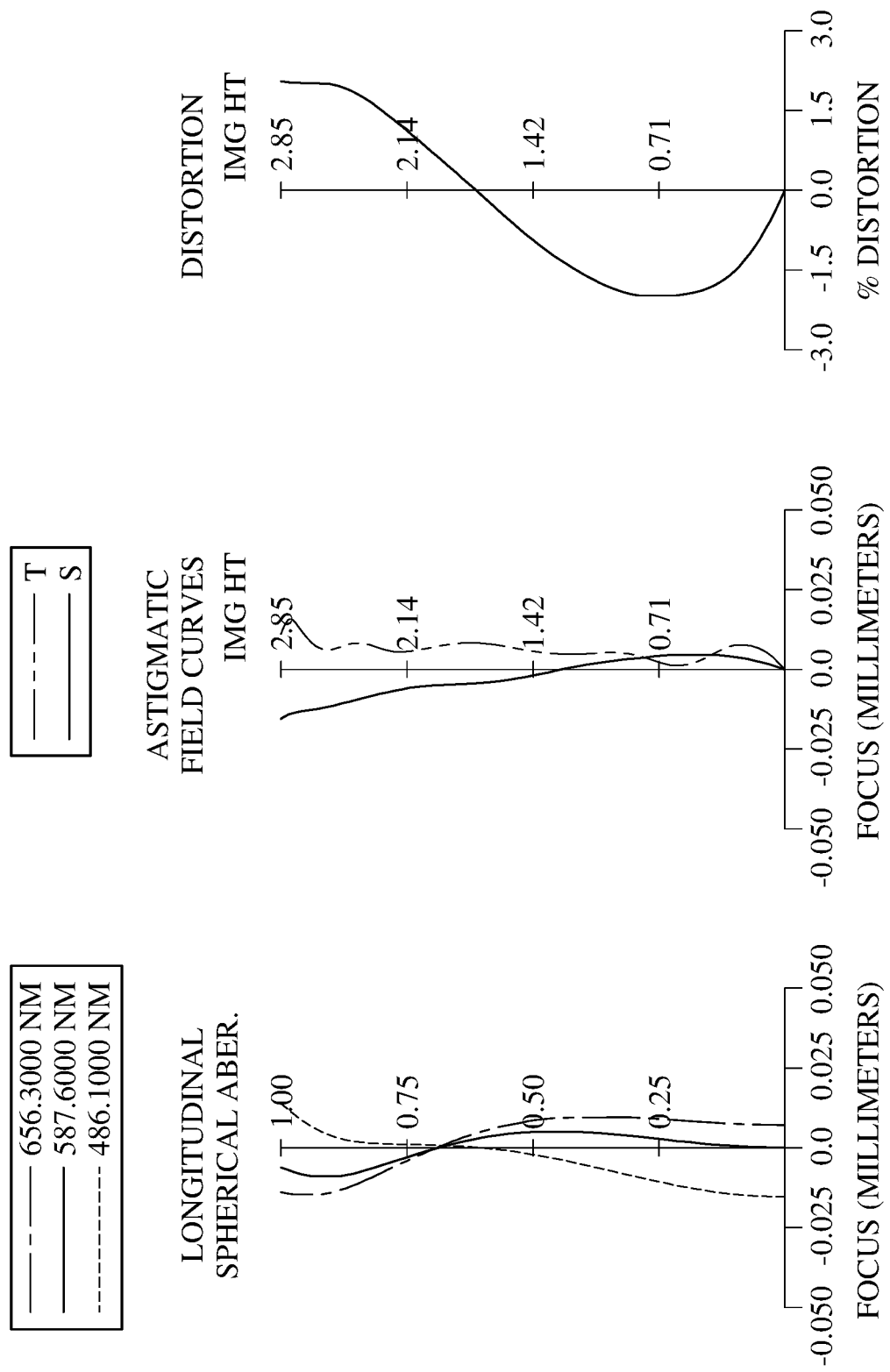
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical photographing system (its reference numeral is omitted) of the present disclosure and an image sensor 770. The optical photographing system includes, in order of an optical path sequentially passing by, a first lens element 710, an aperture stop 700, a second lens element 720, a third lens element 730, a fourth lens element 740, a filter 750 and an image surface 760. The optical photographing system includes four lens elements (710, 720, 730 and 740) with no additional lens element disposed between each of the adjacent four lens elements.

The first lens element 710 has a first refractive surface 711 being convex in a paraxial region thereof, a first reflective surface 712 being concave in a paraxial region thereof, a second reflective surface 713 being convex in a paraxial region thereof and a second refractive surface 714 being convex in a paraxial region thereof. The first refractive surface 711 faces toward an object side and is in a peripheral area of an object-side surface (its reference numeral is omitted) of the first lens element 710. The first reflective surface 712 faces toward the object side and is in a peripheral area of an image-side surface (its reference numeral is omitted) of the first lens element 710. The second reflective surface 713 faces toward an image side and is in a central area of the object-side surface of the first lens element 710. The second refractive surface 714 faces toward the image side and is in a central area of the image-side surface of the first lens element 710. The first lens element 710 is made of plastic material and has the first refractive surface 711, the first reflective surface 712, the second reflective surface 713 and the second refractive surface 714 being all aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric. The object-side surface 721 of the second lens element 720 has two inflection points and has one critical point in an off-axis region thereof. The image-side surface 722 of the second lens element 720 has three inflection points and has two critical points in an off-axis region thereof.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has two inflection points and has two critical points in an off-axis region thereof. The image-side surface 732 of the third lens element 730 has four inflection points and has one critical point in an off-axis region thereof.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has four inflection points and has two critical points in an off-axis region thereof. The image-side surface 742 of the fourth lens element 740 has five inflection points and has two critical points in an off-axis region thereof.

The filter 750 is made of glass material and located between the fourth lens element 740 and the image surface 760, and will not affect the focal length of the optical photographing system. The image sensor 770 is disposed on or near the image surface 760 of the optical photographing system.

The detailed optical data of the 7th embodiment are shown in Table 13 and the aspheric surface data are shown in Table 14 below.

TABLE 13

7th Embodiment
f = 13.25 mm, Fno = 1.65, HFOV = 11.9 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Lens 1    | 66.990           | (ASP) | 4.356     | Plastic  | 1.544 | 56.0   | —            |
| 2         | Ape. Stop | −14.140          | (ASP) | −4.156    | Plastic  | 1.544 | 56.0   | —            |
| 3         |           | −8.077           | (ASP) | 3.206     | Plastic  | 1.544 | 56.0   | —            |
| 4         |           | −10.786          | (ASP) | 0.943     |          |       |        |              |
| 5         | Lens 2    | 65.721           | (ASP) | 0.404     | Plastic  | 1.669 | 19.5   | 31.62        |
| 6         |           | −31.119          | (ASP) | 0.487     |          |       |        |              |
| 7         | Lens 3    | −3.146           | (ASP) | 0.300     | Plastic  | 1.660 | 20.4   | −2.79        |
| 8         |           | 4.618            | (ASP) | 0.050     |          |       |        |              |
| 9         | Lens 4    | 1.317            | (ASP) | 0.300     | Plastic  | 1.534 | 55.9   | 14.01        |
| 10        |           | 1.471            | (ASP) | 0.350     |          |       |        |              |
| 11        | Filter    | Plano            |       | 0.210     | Glass    | 1.517 | 64.2   | —            |
| 12        |           | Plano            |       | 0.046     |          |       |        |              |
| 13        | Image     | Plano            |       | —         |          |       |        |              |

Note:
Reference wavelength is 587.6 nm (d-line).
Surface 2 is the first reflective surface 712.
Surface 3 is the second reflective surface 713.

TABLE 14

Aspheric Coefficients

| | Surface # | | | | |
|---|---|---|---|---|---|
| | 1 | 2 | 3 | 4 | 5 |
| k = | 6.8512E+01 | 7.7883E−01 | 5.6803E+00 | −6.2535E−01 | −8.7391E+01 |
| A4 = | −7.3096E−04 | −8.1463E−05 | 6.5053E−04 | −8.2453E−03 | −4.2404E−03 |
| A6 = | −5.4243E−06 | 3.2238E−09 | 1.0538E−04 | −2.0023E−04 | −6.8978E−04 |

TABLE 14-continued

| Aspheric Coefficients | | | | | |
|---|---|---|---|---|---|
| A8 = | — | — | — | −7.3772E−06 | −6.2996E−03 |
| A10 = | — | — | — | 3.2474E−06 | 1.8235E−03 |
| A12 = | — | — | — | — | −1.7245E−04 |
| A14 = | — | — | — | — | 4.3417E−06 |
| A16 = | — | — | — | — | 1.0679E−07 |

| | Surface # | | | | |
|---|---|---|---|---|---|
| | 6 | 7 | 8 | 9 | 10 |
| k = | 8.3852E+00 | −9.9000E+01 | −4.7238E+00 | −4.2760E+01 | −9.9000E+01 |
| A4 = | 3.2697E−02 | −2.5300E−02 | −3.5376E−02 | −5.0598E−02 | −7.2185E−02 |
| A6 = | −1.0497E−03 | 1.1242E−02 | −7.6480E−03 | 5.2030E−02 | 8.3677E−02 |
| A8 = | −5.8644E−03 | 3.0799E−03 | 1.1098E−02 | −2.3358E−02 | −3.7443E−02 |
| A10 = | 2.2163E−03 | −2.3956E−03 | −4.0644E−03 | 5.4868E−03 | 8.8273E−03 |
| A12 = | −3.8792E−04 | 5.3505E−04 | 7.5492E−04 | −7.3149E−04 | −1.1725E−03 |
| A14 = | 3.4262E−05 | −5.4078E−05 | −7.2437E−05 | 5.2274E−05 | 8.3028E−05 |
| A16 = | −1.1956E−06 | 2.0672E−06 | 2.8098E−06 | −1.5322E−06 | −2.4348E−06 |

In the 7th embodiment, the equation of the aspheric surface profiles of the aforementioned lens elements is the same as the equation of the 1st embodiment. Also, the definitions of these parameters shown in the following table are the same as those stated in the 1st to 6th embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 13.25 | YR1o/YR1i | 2.07 |
| Fno | 1.65 | YR2/YLI | 0.86 |
| HFOV [deg.] | 11.9 | YM1o/YM1i | 1.51 |
| (V/N)min | 11.7 | ImgH/YM1i | 1.02 |
| Vmin | 19.5 | BL/YM2 | 0.28 |
| CT1/(ΣCT-CT1) | 3.19 | YM1i/YR2 | 1.16 |
| ΣCT/TL | 0.67 | ImgH/f | 0.22 |
| TL [mm] | 6.30 | (YM1i-YR2)/TM1R2 | −1.48 |
| CRAmax [deg.] | 33.80 | Yinf21/YM2 | 0.22; 1.00 |
| RImin [%] | 82.80 | Yinf22/YM2 | 0.14; 0.62; 1.08 |
| YR1o [mm] | 4.41 | Yinf31/YM2 | 0.44; 0.98 |
| YR1i [mm] | 2.13 | Yinf32/YM2 | 0.31; 0.79; 0.89; 1.24 |
| YM1o [mm] | 4.22 | Yinf41/YM2 | 0.19; 0.38; 0.63; 1.14 |
| YM1i [mm] | 2.80 | Yinf42/YM2 | 0.14; 0.35; 0.75; 1.18; 1.30 |

8th Embodiment

Figure 15:
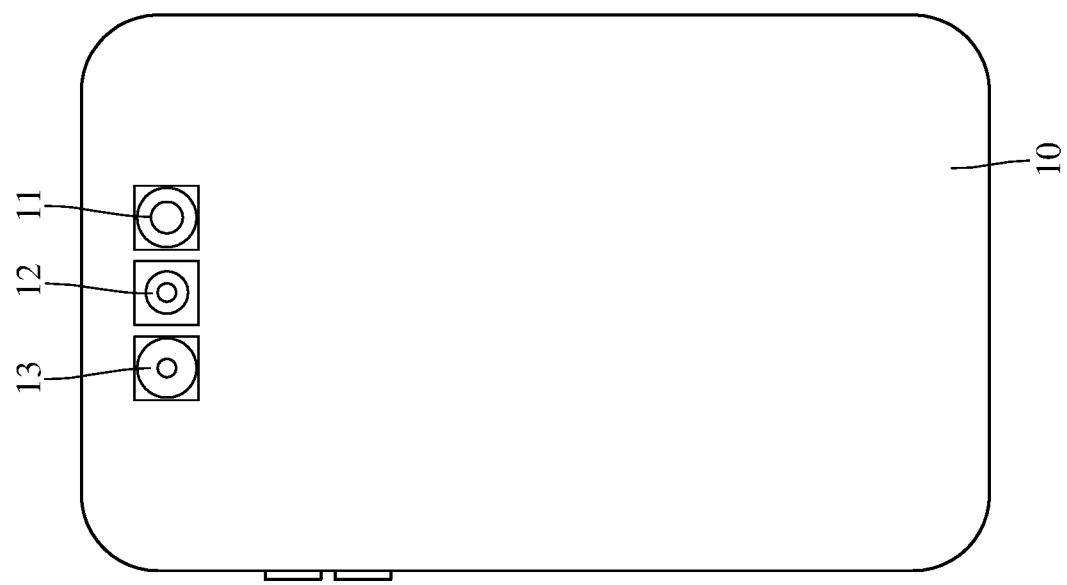
FIG. 15 is a perspective view of an electronic device according to the 8th embodiment of the present disclosure.
Figure 16:
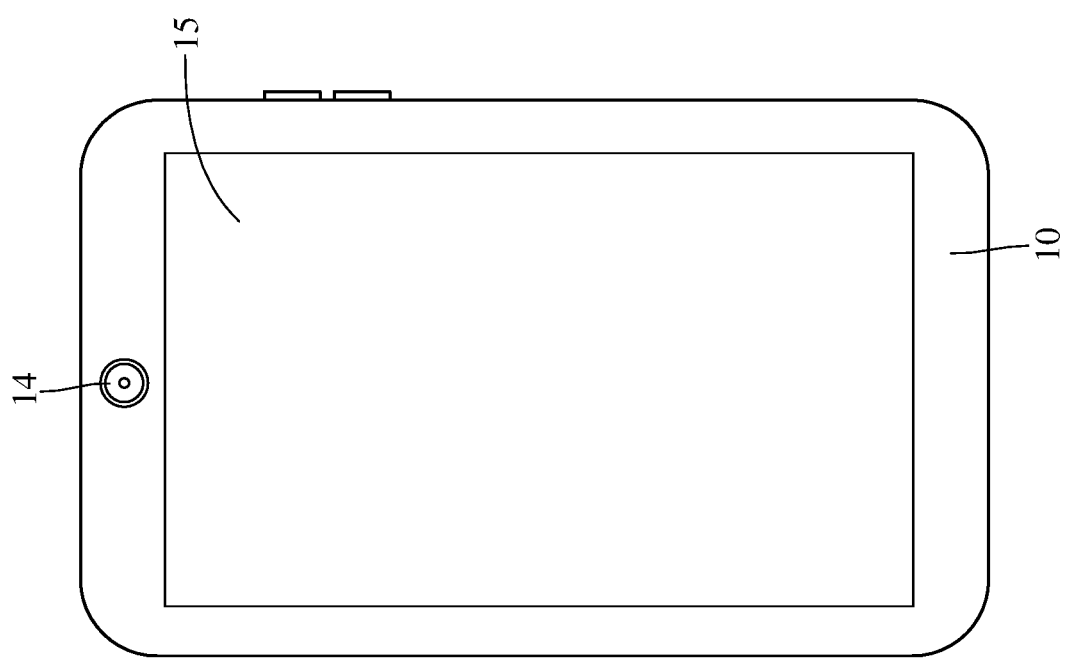
FIG. 16 is another perspective view of the electronic device in FIG. 15.

FIG. 15 is a perspective view of an electronic device according to the 8th embodiment of the present disclosure. FIG. 16 is another perspective view of the electronic device in FIG. 15.

In this embodiment, an electronic device 10 is a smartphone including an image capturing unit 11, an image capturing unit 12, an image capturing unit 13, an image capturing unit 14 and a display unit 15. In this embodiment, the image capturing unit 11 includes the optical photographing system disclosed in the 1st embodiment and an image sensor (their reference numbers are omitted).

In this embodiment, the image capturing units 11, 12 and 13 have different fields of view. In detail, the image capturing unit 11 is a telephoto image capturing unit, the image capturing unit 12 is a standard image capturing unit and the image capturing unit 13 is a wide-angle image capturing unit, wherein the maximum field of view of the image capturing unit 11 and the maximum field of view of the image capturing unit 12 can differ by at least 45 degrees, or the maximum field of view of the image capturing unit 11 and the maximum field of view of the image capturing unit 13 can differ by at least 45 degrees. As such, the electronic device 10 has various magnification ratios so as to meet the requirement of optical zoom functionality for various applications. Moreover, the maximum field of view of the image capturing unit 11 and the maximum field of view of the image capturing unit 12 can also differ by at least 65 degrees, or the maximum field of view of the image capturing unit 11 and the maximum field of view of the image capturing unit 13 can also differ by at least 65 degrees.

In this embodiment, the image capturing units 11, 12 and 13 are all disposed on the same side of the electronic device 10, while the image capturing unit 14 and display unit 15 are disposed on the opposite side of the electronic device 10. The image capturing unit 14 is a front-facing camera of the electronic device 10 for taking selfies, but the present disclosure is not limited thereto.

The smartphone in this embodiment is only exemplary for showing the optical photographing system of the present disclosure installed in an electronic device, and the present disclosure is not limited thereto. The optical photographing system can be optionally applied to systems with a movable focus. Furthermore, the optical photographing system features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing system comprising a plurality of lens elements, the plurality of lens elements comprising, in order from an object side to an image side, a first lens element, a second lens element and a last lens element, wherein there is no additional lens element disposed between the first lens element and the second lens element, and there is no additional lens element disposed between the last lens element and an image surface;

wherein the first lens element has a first refractive surface, a first reflective surface, a second reflective surface and a second refractive surface; the first reflective surface faces toward the object side, the second reflective surface faces toward the image side, and at least one lens element of the optical photographing system has at least one lens surface with at least one inflection point; and wherein a vertical distance between the at least one inflection point and an optical axis is Yinf, a maximum effective radius of the second reflective surface is YM2, a focal length of the optical photographing system is f, a curvature radius of an object-side surface of the last lens element is RLO, and the following conditions are satisfied:

$0 < Yinf/YM2 < 2.0$; and $-3.0 < f/RLO$.

2. The optical photographing system of claim 1, wherein the first refractive surface, the first reflective surface, the second reflective surface and the second refractive surface are coaxial on the optical axis, the first refractive surface is located in a peripheral area of an object-side surface of the first lens element, the first refractive surface has an outer effective radius YR1$o$ and an inner effective radius YR1$i$, the first reflective surface is located in a peripheral area of an image-side surface of the first lens element, the first reflective surface is concave, the first reflective surface has an outer effective radius YM1$o$ and an inner effective radius YM1$i$, the second reflective surface is located in a central area of the object-side surface of the first lens element, the second reflective surface is convex, the second refractive surface is located in a central area of the image-side surface of the first lens element, and an optical path sequentially passes by the first refractive surface, the first reflective surface, the second reflective surface and the second refractive surface.

3. The optical photographing system of claim 1, wherein the object-side surface of the last lens element is convex in a paraxial region thereof.

4. The optical photographing system of claim 1, wherein the last lens element has an image-side surface being concave in a paraxial region thereof, and the image-side surface of the last lens element has at least one convex shape in an off-axis region thereof.

5. The optical photographing system of claim 1, wherein the first lens element is made of plastic material, a maximum value among all chief ray angles on the image surface of the optical photographing system is CRAmax, and the following condition is satisfied:

CRAmax<35 [deg.].

6. The optical photographing system of claim 1, wherein there is a recess structure in a central area of an image-side surface of the first lens element, and the second lens element is located in the recess structure.

7. The optical photographing system of claim 1, wherein there is a recess structure in a central area of an image-side surface of the first lens element, and there is a light limiting region at an inner surface of the recess structure.

8. The optical photographing system of claim 1, wherein at least one lens element of the optical photographing system has at least one lens surface with at least one critical point in an off-axis region thereof, an axial distance between the second reflective surface and the image surface is TL, a vertical distance between the at least one critical point and the optical axis is Yc, and the following conditions are satisfied:

$TL < 9.0$ [mm]; and $0.01 < Yc/TL < 1.50$.

9. The optical photographing system of claim 1, wherein a sum of central thicknesses of all lens elements of the optical photographing system is ΣCT, an axial distance between the second reflective surface and the image surface is TL, and the following condition is satisfied:

$0.60 < \Sigma CT/TL < 0.95$.

10. The optical photographing system of claim 1, wherein an axial distance between the second reflective surface and the image surface is TL, an outer effective radius of the first refractive surface is YR1$o$, and the following condition is satisfied:

$0.50 < TL/YR1o < 2.0$.

11. The optical photographing system of claim 1, wherein an outer effective radius of the first refractive surface is YR1$o$, half of a maximum field of view of the optical photographing system is HFOV, and the following conditions are satisfied:

$2.0$ [mm] $< YR1o < 10.0$ [mm]; and $0$ [deg.] $< HFOV < 15.0$ [deg.].

12. The optical photographing system of claim 1, wherein an outer effective radius of the first refractive surface is YR1$o$, an inner effective radius of the first refractive surface is YR1$i$, and the following condition is satisfied:

$1.20 < YR1o/YR1i < 2.50$;

wherein an Abbe number of a lens element of the optical photographing system is V, a refractive index of the lens element of the optical photographing system is N, and at least one lens element of the optical photographing system satisfies the following condition:

$V/N < 12.0$.

13. An optical photographing system comprising a plurality of lens elements, the plurality of lens elements comprising, in order from an object side to an image side:

a first lens element, wherein the first lens element has an object-side surface facing toward the object side and an image-side surface facing toward the image-side surface, each of the object-side surface and the image-side surface of the first lens element has a central area and a peripheral area; there is a first refractive surface in the peripheral area of the object-side surface of the first lens element, there is a first reflective surface in the peripheral area of the image-side surface of the first lens element, there is a second reflective surface in the central area of the object-side surface of the first lens element, and there is a second refractive surface in the central area of the image-side surface of the first lens element;

a second lens element, wherein there is no additional lens element disposed between the first lens element and the second lens element; and a last lens element, wherein there is no additional lens element disposed between the last lens element and an image surface;

wherein at least one lens element of the optical photographing system has at least one lens surface with at least one inflection point; and wherein a vertical distance between the at least one inflection point and an optical axis is Yinf, a maximum effective radius of the second reflective surface is YM2, a minimum value among Abbe numbers of all lens elements of the optical photographing system is Vmin, and the following conditions are satisfied:

$0<Yinf/YM2<2.0$; and $10.0<Vmin<20.0$.

14. The optical photographing system of claim 13, wherein each of the second lens element and the last lens element has at least one lens surface with at least one inflection point.

15. The optical photographing system of claim 13, wherein the last lens element has positive refractive power.

16. The optical photographing system of claim 13, wherein a maximum effective radius of the second refractive surface is YR2, a maximum effective radius of an image-side surface of the last lens element is YLI, and the following condition is satisfied:

$0.70<YR2/YLI<1.30$.

17. The optical photographing system of claim 13, wherein an outer effective radius of the first reflective surface is YM1o, an inner effective radius of the first reflective surface is YM1i, a maximum effective radius of the second refractive surface is YR2, and the following conditions are satisfied:

$1.10<YM1o/YM1i<1.80$; and $1.10<YM1i/YR2<2.0$.

18. The optical photographing system of claim 13, wherein an axial distance between an image-side surface of the last lens element and the image surface is BL, the maximum effective radius of the second reflective surface is YM2, and the following condition is satisfied:

$0.10<BL/YM2<0.75$.

19. The optical photographing system of claim 13, wherein a minimum value among relative illuminances of all fields of view of the optical photographing system is RImin, and the following condition is satisfied:

$60\%<RImin<100\%$.

20. The optical photographing system of claim 13, wherein a maximum image height of the optical photographing system is ImgH, an inner effective radius of the first reflective surface is YM1i, an outer effective radius of the first refractive surface is YR1o, and the following conditions are satisfied:

$ImgH/YM1i<1.0$; and $1.20<YR1o/ImgH<5.0$.

21. The optical photographing system of claim 13, wherein a maximum image height of the optical photographing system is ImgH, a focal length of the optical photographing system is f, an axial distance between the second reflective surface and the image surface is TL, and the following conditions are satisfied:

$ImgH/f<0.25$; and $0.10<TL/f<0.65$.

22. The optical photographing system of claim 13, wherein the minimum value among Abbe numbers of all lens elements of the optical photographing system is Vmin, and the following condition is satisfied:

$10.0<Vmin\leq19.5$.

23. The optical photographing system of claim 13, wherein an Abbe number of a lens element of the optical photographing system is V, a refractive index of the lens element of the optical photographing system is N, and at least one lens element of the optical photographing system satisfies the following condition:

$V/N<12.0$.

24. The optical photographing system of claim 13, wherein each of the second lens element and the last lens element has a light limiting region at a peripheral region thereof.

25. An electronic device, comprising at least two image capturing units disposed on a same side of the electronic device, and the at least two image capturing units comprising:

a first image capturing unit, comprising the optical photographing system of claim 13 and an image sensor disposed on the image surface of the optical photographing system; and a second image capturing unit, comprising an optical lens assembly and an image sensor disposed on an image surface of the optical lens assembly;

wherein a maximum field of view of the first image capturing unit and a maximum field of view of the second image capturing unit differ by at least 45 degrees.

26. An optical photographing system comprising a plurality of lens elements, the plurality of lens elements comprising, in order from an object side to an image side, a first lens element, a second lens element and a last lens element, wherein there is no additional lens element disposed between the first lens element and the second lens element, and there is no additional lens element disposed between the last lens element and an image surface;

wherein the first lens element has a first refractive surface, a first reflective surface, a second reflective surface and a second refractive surface; the first reflective surface faces toward the object side, the second reflective surface faces toward the image side, at least one lens element of the optical photographing system has at least one lens surface with at least one inflection point, there is a recess structure in a central area of an image-side surface of the first lens element, and the second lens element is located in the recess structure; and wherein a vertical distance between the at least one inflection point and an optical axis is Yinf, a maximum effective radius of the second reflective surface is YM2, a minimum value among Abbe numbers of all lens elements of the optical photographing system is Vmin, and the following conditions are satisfied:

$0 < Yinf/YM2 < 2.0$; and $5.0 < Vmin < 30.0$.

27. The optical photographing system of claim 26, wherein the last lens element has an image-side surface being concave in a paraxial region thereof.

28. The optical photographing system of claim 26, wherein the last lens element is closer to the object side than the first reflective surface.

29. The optical photographing system of claim 26, wherein there is a stepped structure on an inner surface of the recess structure in the central area of the image-side surface of the first lens element.

30. The optical photographing system of claim 26, wherein there is a light limiting region at a bottom of the recess structure in the central area of the image-side surface of the first lens element.

31. The optical photographing system of claim 26, wherein a central thickness of the first lens element is CT1, a sum of central thicknesses of all lens elements of the optical photographing system is ΣCT, and the following condition is satisfied:

$1.0 < CT1/(\Sigma CT - CT1) < 10.0$.

32. The optical photographing system of claim 26, wherein an inner effective radius of the first reflective surface is YM1$i$, a maximum effective radius of the second refractive surface is YR2, a displacement in parallel with the optical axis from an outer effective radius position of the first reflective surface to an axial vertex of the second refractive surface is TM1R2, and the following condition is satisfied:

$-3.0 < (YM1i - YR2)/TM1R2 < -0.1$.

33. The optical photographing system of claim 26, wherein the minimum value among Abbe numbers of all lens elements of the optical photographing system is Vmin, and the following condition is satisfied:

$5.0 < Vmin < 25.0$.

* * * * *